US008244566B1

(12) United States Patent
Coley et al.

(10) Patent No.: US 8,244,566 B1
(45) Date of Patent: *Aug. 14, 2012

(54) SYSTEMS AND METHODS FOR ON-LINE SCHEDULING OF APPOINTMENTS AND OTHER RESOURCES

(75) Inventors: Chad T. Coley, Bozeman, MT (US);
Kevin S. Nessland, Bozeman, MT (US);
Tim F. Leonhardt, Bozeman, MT (US);
Colin J. Barry, Boulder, CO (US);
Michael F. Wilson, Bozeman, MT (US);
Anthony N. Nettuno, Bozeman, MT (US)

(73) Assignee: Schedulicity Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/421,943

(22) Filed: Mar. 16, 2012

Related U.S. Application Data

(63) Continuation of application No. 12/430,940, filed on Apr. 28, 2009.

(51) Int. Cl.
*G06Q 10/00* (2012.01)
(52) U.S. Cl. ............... 705/7.11; 705/7.12; 705/7.13; 705/7.16; 705/7.18
(58) Field of Classification Search ........... 705/7.11, 705/7.12, 7.13, 7.16, 7.18
See application file for complete search history.

(56) References Cited

U.S. PATENT DOCUMENTS

| | | | |
|---|---|---|---|
| 5,732,398 A | 3/1998 | Tagawa | |
| 5,855,006 A | 12/1998 | Huemoeller et al. | |
| 5,937,388 A | 8/1999 | Davis et al. | |
| 5,940,807 A | 8/1999 | Purcell | |
| 5,948,040 A | 9/1999 | DeLorme et al. | |
| 5,960,406 A | 9/1999 | Rasansky et al. | |
| 5,970,466 A | 10/1999 | Detjen et al. | |
| 5,978,770 A | 11/1999 | Waytena et al. | |
| 6,041,305 A | 3/2000 | Sakurai | |
| 6,094,681 A | 7/2000 | Shaffer et al. | |
| 6,329,919 B1 | 12/2001 | Boies et al. | |
| 6,345,260 B1 | 2/2002 | Cummings, Jr. et al. | |
| 6,369,840 B1 | 4/2002 | Barnett et al. | |
| 6,510,451 B2 | 1/2003 | Wu et al. | |
| 6,526,335 B1 | 2/2003 | Treyz et al. | |
| 6,728,530 B1 | 4/2004 | Heinonen et al. | |
| 6,732,080 B1 | 5/2004 | Blants | |
| 6,748,364 B1 | 6/2004 | Waytena et al. | |
| 6,813,608 B1 | 11/2004 | Baranowski | |
| 6,876,973 B1 | 4/2005 | Visconti | |
| 6,877,987 B2 | 4/2005 | Kulack | |
| 7,013,289 B2 | 3/2006 | Horn et al. | |
| 7,016,857 B1 | 3/2006 | Lloyd et al. | |
| 7,028,178 B2 | 4/2006 | Orlick | |
| 7,039,596 B1 | 5/2006 | Lu | |
| 7,069,228 B1 | 6/2006 | Rose et al. | |
| 7,085,818 B2 | 8/2006 | Brown et al. | |
| 7,089,193 B2 | 8/2006 | Newbold | |

(Continued)

*Primary Examiner* — Mark A Fleischer
(74) *Attorney, Agent, or Firm* — K&L Gates LLP

(57) ABSTRACT

Computer-based system and computer-implemented methods for providing an automated computer network-based, or online, appointment scheduling service through which registered customers are individually capable of scheduling an appointment with a plurality of businesses that are also registered with the online appointment scheduling service. The application describes an optimization algorithm for controlling the start times presented to a customer when selecting an appointment time that seeks to cluster the new appointment to existing appointments for the business in order to reduce time gaps during the day for the business/service provider that are of insufficient duration to schedule other appointments for other customers of the business.

32 Claims, 17 Drawing Sheets

U.S. PATENT DOCUMENTS

| | | | |
|---|---|---|---|
| 7,120,603 | B2 | 10/2006 | Kodaka et al. |
| 7,188,073 | B1 | 3/2007 | Tam et al. |
| 7,197,469 | B2 | 3/2007 | Hegde et al. |
| 7,249,041 | B2 | 7/2007 | Last |
| 7,386,623 | B2 | 6/2008 | Nishimura et al. |
| 7,388,950 | B2 | 6/2008 | Elsey et al. |
| 7,392,060 | B2 | 6/2008 | Kilian-Kehr et al. |
| 7,454,361 | B1 | 11/2008 | Halavais et al. |
| 7,457,765 | B2 | 11/2008 | Thompson et al. |
| 7,472,181 | B2 | 12/2008 | Hollinger et al. |
| 7,499,537 | B2 | 3/2009 | Elsey et al. |
| 7,933,228 | B2 * | 4/2011 | Coley ............................ 370/278 |
| 8,073,725 | B2 | 12/2011 | Loring et al. |
| 2001/0005831 | A1 | 6/2001 | Lewin et al. |
| 2001/0011225 | A1 | 8/2001 | O'Connor et al. |
| 2001/0027481 | A1 | 10/2001 | Whyel |
| 2001/0051892 | A1 | 12/2001 | Brown |
| 2002/0035493 | A1 | 3/2002 | Mozayeny et al. |
| 2002/0035521 | A1 | 3/2002 | Powers |
| 2002/0049733 | A1 | 4/2002 | Orlick |
| 2002/0055351 | A1 | 5/2002 | Elsey et al. |
| 2002/0065828 | A1 | 5/2002 | Goodspeed |
| 2002/0069096 | A1 | 6/2002 | Lindoerfer et al. |
| 2002/0095319 | A1 | 7/2002 | Swart et al. |
| 2002/0095328 | A1 * | 7/2002 | Swart et al. ...................... 705/10 |
| 2002/0103681 | A1 | 8/2002 | Tolis et al. |
| 2002/0111844 | A1 | 8/2002 | Vanstory et al. |
| 2002/0116220 | A1 | 8/2002 | Glazier |
| 2002/0116232 | A1 | 8/2002 | Rapp et al. |
| 2002/0131572 | A1 | 9/2002 | Paradis |
| 2002/0143600 | A1 | 10/2002 | Dugan |
| 2002/0191035 | A1 | 12/2002 | Selent |
| 2003/0023463 | A1 | 1/2003 | Dombroski et al. |
| 2003/0061087 | A1 | 3/2003 | Srimuang |
| 2003/0088479 | A1 | 5/2003 | Wooten et al. |
| 2003/0130882 | A1 | 7/2003 | Shuttleworth et al. |
| 2003/0135458 | A1 | 7/2003 | Tadano et al. |
| 2004/0039628 | A1 | 2/2004 | Thompson et al. |
| 2004/0098740 | A1 | 5/2004 | Maritzen et al. |
| 2004/0122915 | A1 | 6/2004 | Saare et al. |
| 2004/0128173 | A1 | 7/2004 | Salonen |
| 2004/0259535 | A1 | 12/2004 | Elsey et al. |
| 2004/0267585 | A1 | 12/2004 | Anderson et al. |
| 2005/0002501 | A1 | 1/2005 | Elsey et al. |
| 2005/0002509 | A1 | 1/2005 | Elsey et al. |
| 2005/0002510 | A1 | 1/2005 | Elsey et al. |
| 2005/0027580 | A1 | 2/2005 | Crici et al. |
| 2005/0055252 | A1 | 3/2005 | Todd |
| 2005/0097440 | A1 | 5/2005 | Lusk et al. |
| 2005/0102154 | A1 | 5/2005 | Dodd et al. |
| 2005/0203765 | A1 | 9/2005 | Maritzen et al. |
| 2005/0228705 | A1 | 10/2005 | Irwin |
| 2005/0234741 | A1 | 10/2005 | Rana et al. |
| 2005/0267787 | A1 | 12/2005 | Rose et al. |
| 2006/0026051 | A1 | 2/2006 | Rose |
| 2006/0031105 | A1 | 2/2006 | Lee et al. |
| 2006/0085217 | A1 | 4/2006 | Grace |
| 2006/0122861 | A1 | 6/2006 | Scott et al. |
| 2006/0136309 | A1 | 6/2006 | Horn et al. |
| 2006/0293943 | A1 | 12/2006 | Tischhauser et al. |
| 2007/0021998 | A1 | 1/2007 | Laithwaite et al. |
| 2008/0082980 | A1 | 4/2008 | Nessland et al. |
| 2008/0091726 | A1 | 4/2008 | Koretz et al. |
| 2008/0249830 | A1 | 10/2008 | Gilman et al. |
| 2008/0275741 | A1 | 11/2008 | Loeffen |
| 2008/0313005 | A1 * | 12/2008 | Nessland et al. .................. 705/9 |
| 2009/0125325 | A1 | 5/2009 | Martinez et al. |
| 2009/0177489 | A1 * | 7/2009 | Martinez et al. .................. 705/2 |
| 2010/0145720 | A1 | 6/2010 | Reiner |

* cited by examiner

Fig. 11

SYSTEMS AND METHODS FOR ON-LINE SCHEDULING OF APPOINTMENTS AND OTHER RESOURCES

CROSS REFERENCE TO RELATED APPLICATIONS

The present application is a continuation application claiming priority under 35 U.S.C. §120 from co-pending U.S. patent application Ser. No. 12/430,940, entitled SYSTEMS AND METHODS FOR ON-LINE SCHEDULING OF APPOINTMENTS AND OTHER RESOURCES, filed Apr. 28, 2009, the entire disclosure of which is incorporated by reference herein.

BACKGROUND

Businesses that provide services or rent physical resources to their customers must pay close attention to resource scheduling and utilization. Tracking which human resources are available to provide which services, knowing which physical resources are currently in use, notifying staff of upcoming appointments, quickly answering customer inquiries about resource availability, are common challenges to all service-oriented businesses, and a major portion of each work day is spent monitoring resource schedules and responding to customer requests for appointments. Often, one or more employees are dedicated to nothing more than taking appointments and ensuring resources are in the right place at the right time. In sole proprietor shops, these activities have a direct impact on the bottom line as time spent booking appointments is time lost delivering services and earning revenue.

To address this problem, the marketplace has responded with information technology solutions to help track and schedule both human and non-human resources. Several resource-scheduling software applications are known that are intended to aid the service provider with setting schedules, booking appointments, and monitoring current utilization of resources. While these innovations are indeed valuable and widely used, the problem remains that one or more employees must still monitor and update this "electronic planner," referring to it each time a customer calls for an appointment and updating it often to reflect new and cancelled appointments.

Several Internet-based scheduling solutions have been proposed recently, but their widespread adoption has been slowed for several reasons. First, there is the issue of a service provider letting its customers know that they have the option of scheduling appointments without calling or walking into the shop. While customer adoption of Internet technology has increased significantly since its introduction, so too has the number of web sites and Internet-based applications. A service provider telling its customers to visit a web URL to schedule upcoming appointments is easily lost in the cacophony of advertising and media reports of the hottest, latest web destinations. Second, considering the number of service providers with which a typical individual interacts on a regular basis (esthetician, hair stylist, mechanic, personal trainer, etc.), it is not long before a smattering of web sites to make life easier becomes a deluge of user names and passwords that must be recalled with each attempt to schedule online.

One answer to the problem of the standalone service provider resource scheduling web site has been aggregate resource scheduling software systems, described in prior art as public network (typically World Wide Web) destinations that provide a single interface to the scheduling calendars of a plurality of service providers. This approach has some advantages for the customer, such as providing a one-stop shop that is easily bookmarked by regular visitors for use over and over again, and easily remembered by new visitors who might happen upon the URL in advertising, conversation with friends and acquaintances, or interaction with their favorite service providers whose schedules are available on the site. These sites often require the customer to remember only a single user name and password that can be used to schedule appointments with a plurality of service providers.

Unfortunately, the technical implementation of an aggregate resource scheduling software system is not without its difficulties. Such systems typically employ one of two architectural models: (a) distributed systems that use data replication to pull data from disparate scheduling systems to create a single appointment scheduling database; and (b) centralized systems with a single database that is used by both customers and disparate service providers for all scheduling.

In systems that use a distributed architecture, the aggregate resource scheduling software typically allows the customer to review scheduling information and create an appointment using data available in a central database. These systems face the complex problem of synchronizing data that is updated centrally with that updated locally by the service providers in their separate, standalone resource scheduling applications. To avoid "double-booking" (scheduling the same service or resource twice in the same time slot in separate software systems), distributed systems using this architecture must either frequently replicate data bi-directionally or set new appointments made using the aggregate resource scheduling interface to a status of "pending" while the service provider makes a manual decision to accept or reject the appointment. If the resource scheduling software uses data replication as the solution to this problem, information must be forwarded to the centralized database as appointments are made in the separate service provider scheduling applications so that customers querying the central database for open time slots receive accurate information. Likewise, as appointments are scheduled centrally, that data must be sent back to the service provider database to both notify the service provider of the new appointments and to avoid double-booking in the service provider's scheduling software.

The replication of data is not as simple as it sounds. Even with very frequent replication, the possibility exists that a time slot may have been double-booked in the separate software systems between replication events. Conflicts are inevitable, and software systems that share data in this manner must possess business logic that allows system users to review these conflicts and determine which appointment should be retained and which should be discarded. A discarded appointment requires communication with the losing customer to inform him or her that an appointment must be rescheduled.

Aggregate resource scheduling software systems that use "decisioning" to deal with double-booking, i.e., they set all new appointments to a status of "pending" until the appointment is accepted or rejected by someone who has access to the service provider's authoritative schedule, are simple to implement technically, but lack the immediate feedback desired by customers and do little to lessen the manual workload of maintaining an "electronic planner" in the service provider's shop.

SUMMARY

In one general aspect, the present invention is directed to computer-based apparatuses and computer-implemented methods for providing an automated computer network-based, or online, appointment scheduling service through which registered customers are individually capable of scheduling an appointment with a plurality of businesses that are also registered with the online appointment scheduling service. Several unique features of such an online appointment scheduling service are described in this application. For example, the application describes a reliability rating for each registered customer that is based on the reliability of the customer showing for scheduled appointments for all (or several) of the businesses registered with the online appointment scheduling service, not just one business. In addition, the application describes an optimization algorithm for controlling the start times presented to a customer when selecting an appointment time that seeks to cluster the new appointment to existing appointments for the business in order to reduce time gaps during the day for the business/service provider that are of insufficient duration to schedule other appointments for other customers of the business.

These and other unique features of the online appointment scheduling service are described below.

FIGURES

Various embodiments of the present invention are described herein by way of example in conjunction with the following figures, wherein:

FIGS. 1A-B, 2, and 12 are diagrams of a system that provides an online appointment scheduling service according to various embodiments of the present invention;

FIG. 11 is an example screen shot of web page provided by the data center in which a customer end user may create an account for the online scheduling service according to various embodiments of the present invention;

Figure 15:
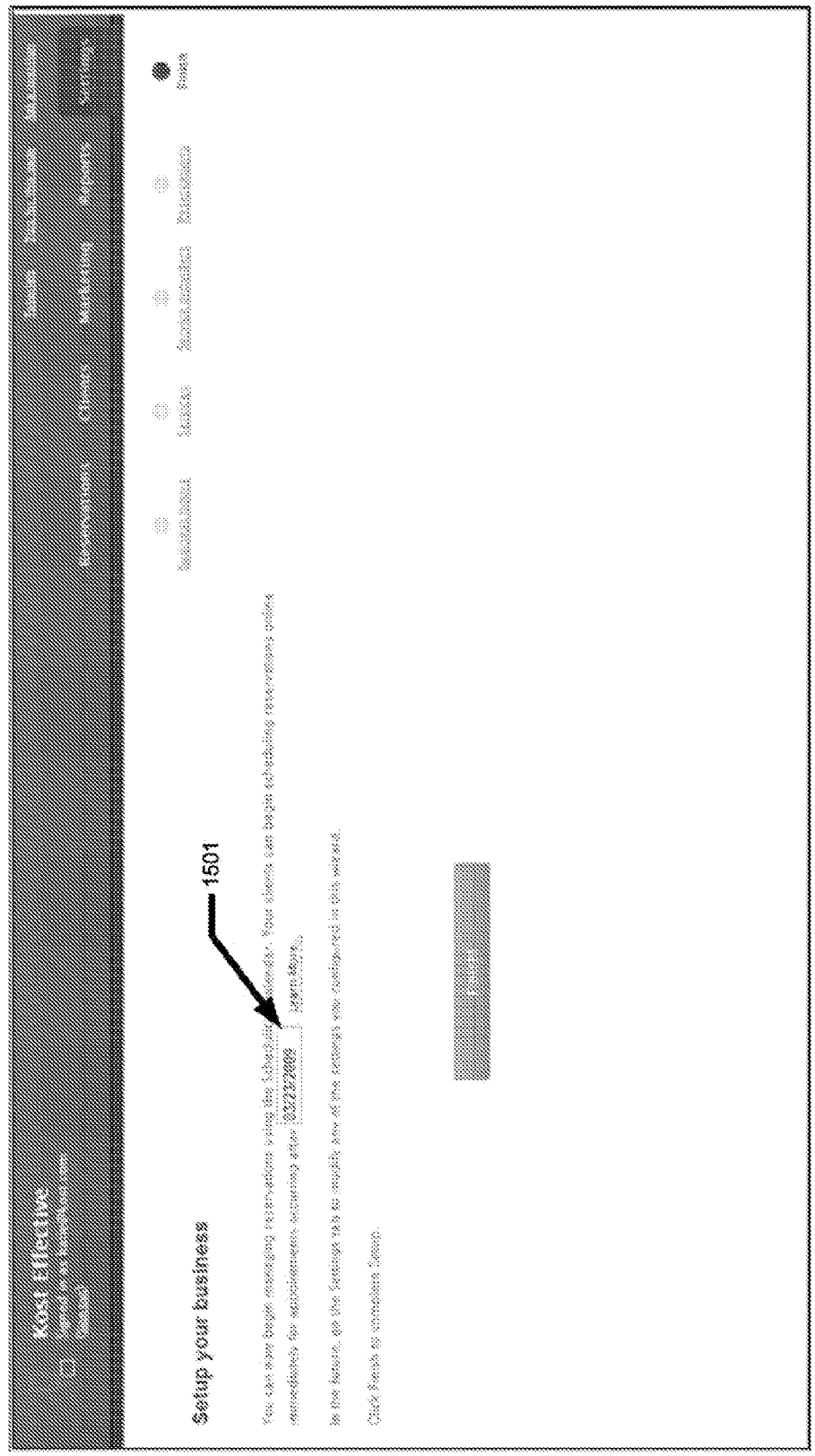
Figure 16:
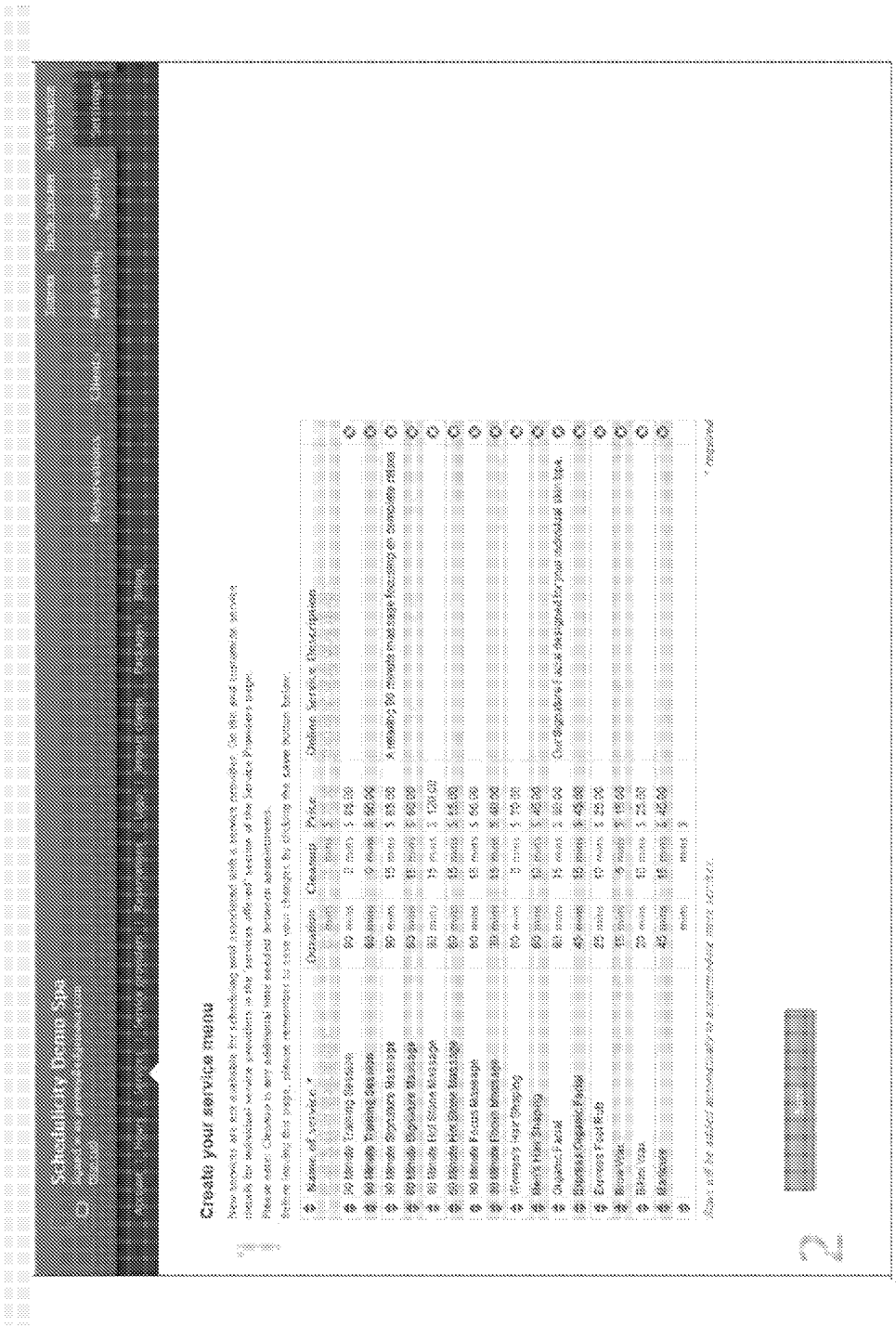

FIG. 15 is an example screen shot of web page provided by the data center in which a business end user may set a phase-in date for the online scheduling service according to various embodiments of the present invention; and FIG. 16 is an example screen shot of web page provided by the data center in which a business end user may specify attributes for services provided by the business according to various embodiments of the present invention.

DESCRIPTION

Figure 1A:
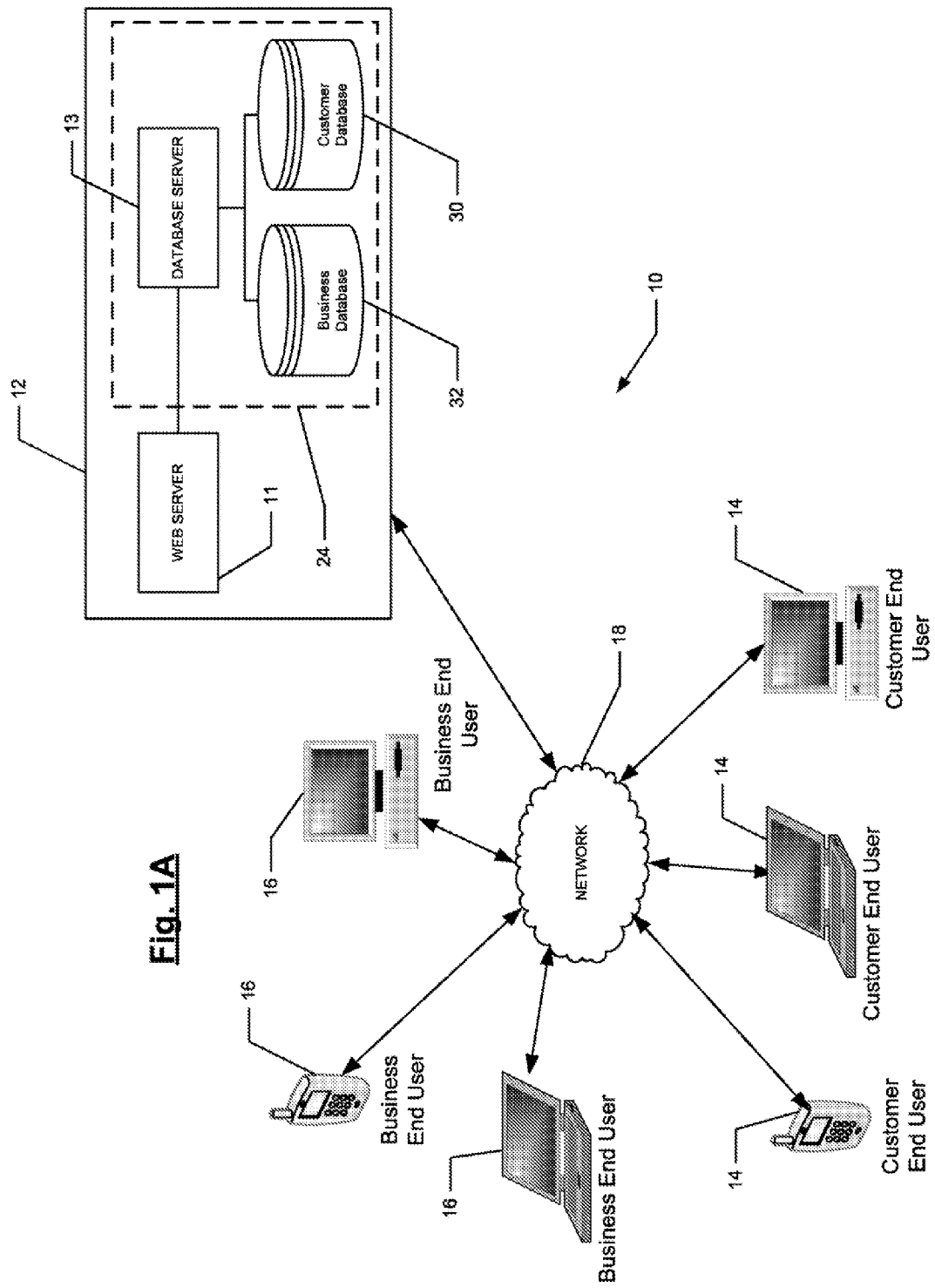

In one general aspect, the present invention is related to computer-based systems and methods through which customers can schedule online appointments for human and non-resources offered by a business, and through which the business can maintain and manage its schedule of appointments, etc. FIG. 1A is block diagram of a system 10 according to one embodiment of the present invention. The system 10 comprises a computerized data center 12 in communication with customer end users 14 and business end users 16 via an electronic, computer-based communications network 18. The communications network 18 may comprise a number of computer and/or data networks, including the Internet, LANs, WANs, GPRS networks, 3G networks, etc., and may comprise wired and/or wireless communication links. The end-users 14, 16 may communicate with the data center 12 and each other via the network 18 using any type of client device suitable for communication over the network 18, including personal computers, laptop computers, smartphones, televisions, etc. The end-users 14, 16 preferably have browser software on their end-user devices so that they can display and interact with web pages at web sites hosted by the data center 12.

As used herein, a "customer" or "customer end user 14" is a person or entity seeking to schedule an appointment for a service or resource through the online scheduling network provided by the data center. In this description, the terms "appointments" and "reservations" are used synonymously unless otherwise noted. Also, as used in this description, a "business" or "business end user 16" is a business at which the customer seeks to schedule the appointment online. A business may offer human and/or non-human resources. The human resources or services provided by the businesses and their associated service providers may include: hair styling; massages; physical therapy; workout training; manicures; professional services (e.g., lawyer appointments, accountant appointments, doctor appointments); automobile repair and/or service; golf lessons; acupuncture; music lessons; photographer sessions, etc. Non-human resources refer to resources that do not necessarily require a human service provider, such as the renting of equipment or space provided by the business, such as tennis courts, tanning beds, and conference rooms, etc.

As used herein, a "service provider" is a person associated with a business that provides the human services. A service provider may be employed by the business or an independent contractor or have some other association with the business. In the case where the business is a sole proprietorship, the business effectively will be the service provider, so the two terms can be synonymous in some circumstances. Although the term "business" is used in this description as the entity where or through which the services are provided, it should be noted that a "business" as usual herein could be any commercial or non-commercial enterprise that accepts appointments or reservations for human and/or non-human resources.

As shown in FIG. 1A, the data center 12 may comprise a web server (or servers) 11 and a database system 24. The database system 24 may comprise a database server 13 and one or more computer databases, including, for example, a customer database 30 and a business database 32. The web server 11 may host a web portal for customers through which customers 14 can schedule, cancel, and view their respective appointments. In addition, the web server 11 may host a web portal for businesses through which businesses can view, manage, and maintain their respective schedules of appointments. The web portals provided by the web server 11 may comprise a number of web interfaces that users (e.g., customer end users 14 and/or business end users 16) may access to schedule appointments and manage their schedules. In such an embodiment, the data center 12 may utilize a user authentication process to determine if the user is a customer or business.

Figure 1B:
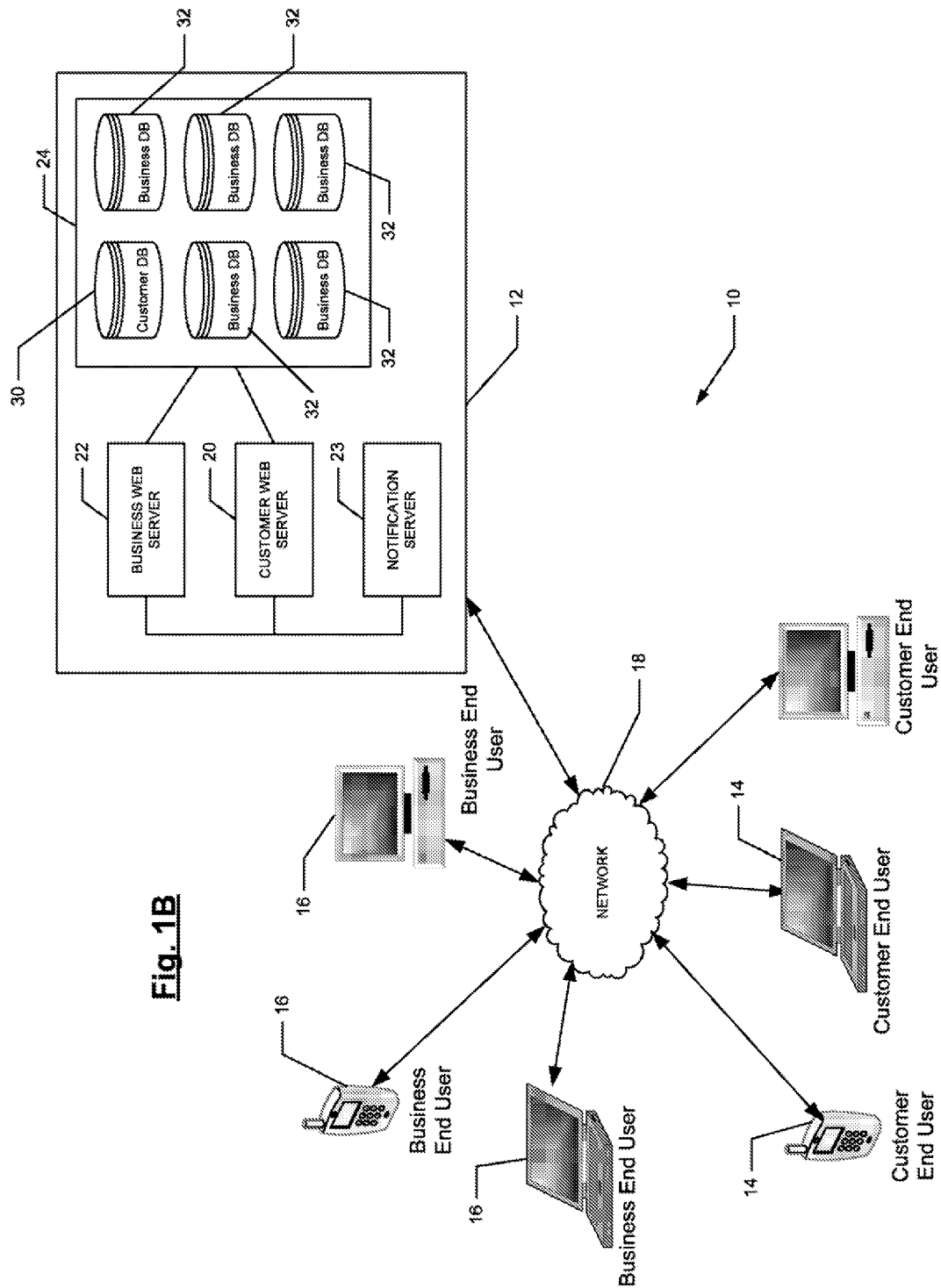

The business database 32 may store data related to businesses registered with the online appointment scheduling service. According to various embodiments, the business database 32 may employ a multi-tenant architecture. For example, the business database 32 may utilize identifying keys to differentiate between businesses. Similarly, the customer database 30 may store data regarding customers registered with the online appointment scheduling service. The database server (or servers) 13 may control the storage and retrieval of data from the databases 30, 32. In addition, as described in more detail below, the database server 13 may transmit electronic notifications to customer end users 14 and/or business end users 16. The electronic notifications may be sent via the network 18 and may comprise email, SMS text messages, instant messages, integrated voice response (IVR) phone calls, and/or any other suitable automated notification type In other embodiments, as shown in FIG. 1B, each business registered with the online appointment scheduling service may have its own database 32. In such an embodiment, the customer database 30 may store electronically user account data for customer end users 14 who use and have registered for the online appointment scheduling service provided by the data center 12. The customer database 30 also may store metadata about the business databases 32. The customer database 30 also may store data common to all businesses 16 registered with the online appointment scheduling service, such as lookup tables containing standard information (i.e., states, etc.).

Also as shown in the embodiment of FIG. 1B, the data center 12 may utilize a customer web server 20 that is separate from a business web server 22. In such an embodiment, the web addresses or URLs for the servers 20, 22 may be different. For example, the customer web server 20 may have a ".com" top level domain and the business web server 22 may have a ".biz" top level domain. In addition, as shown in the example embodiment of FIG. 1B, the data center 12 may comprise a notification server 23 that transmits the electronic notifications to the customer end users 14 and/or the business end users 16. The electronic notifications may be sent via the network 18 and may comprise email, SMS text messages, instant messages, integrated voice response (IVR) phone calls, and/or any other suitable automated notification type.

The web servers 11, 20, 22 may be implemented as electronic computers that are programmed with software to accept HTTP requests from clients (user agents such as web browsers), and serving them HTTP responses along with optional data contents, which usually are web pages such as HTML documents and linked objects (images, etc.). The servers 11, 13, 20, 22, 23 may comprise one or more processors (e.g., CPUs or microprocessors), one or more memory units (e.g., RAM, ROM), non-volatile storage systems (e.g., hard disk drive systems), etc. The processor(s) and/or memory unit(s) may be implemented as integrated circuits (ICs). The servers 11, 13, 20, 22, 23 may utilize operating systems, such as Solaris, Linux, or Windows Server operations systems, for example.

Hereinafter, unless specifically noted, the online appointment scheduling service will be described in the context of the example system embodiment of FIG. 1A.

The business database 32 may store all data specific to the business registered with the online appointment scheduling service, that is, businesses that accept appointments scheduled through the online scheduling network provided by the data center 12. This data may comprise line-of-business data, inventory records, service records, membership/package rewards, sales history, purchase orders, customer profiles (e.g., profiles of customer end users 14), etc. The business database 32 also may store data required for the scheduling of appointments and other scheduled resources, including records for resources that can be booked by customers online, availability periods that define the days and hours a particular service or resource is available for scheduling, reservation records, the service providers associated with the business who perform the services, etc. A customer end-user 14 may, therefore, have a user profile/account record for the entire online scheduling network that enables the customer to schedule appointments through the web interface provided by the data center 12, in addition to separate customer accounts for some or all of the businesses registered with the online appointment scheduling service.

More details about an exemplary database system may be found in published U.S. patent applications Pub. No. 2008/0082980 A1 and Pub. No. 2008/0313005 A1, which are incorporated herein in their entirety. The applications also discuss, among other things, how the data center 12 may communicate in some instances with end users 14, 16 via the network 18 using, for example, SOAP (Simple Object Access Protocol) messages that contain application instructions. The SOAP messages may be processed by a set of XML web services (not shown) of the web servers 20, 22. The XML web services may invoke stored procedures, such as SQL stored procedures to store and retrieve data from the database system 24.

Through the system 10, customer end users 14 may schedule appointments online with businesses 16. The customer end users 14 also may cancel appointments and view their personal appointment schedules using the web interface provided by the web portal hosted by data center 12.

Figure 3:
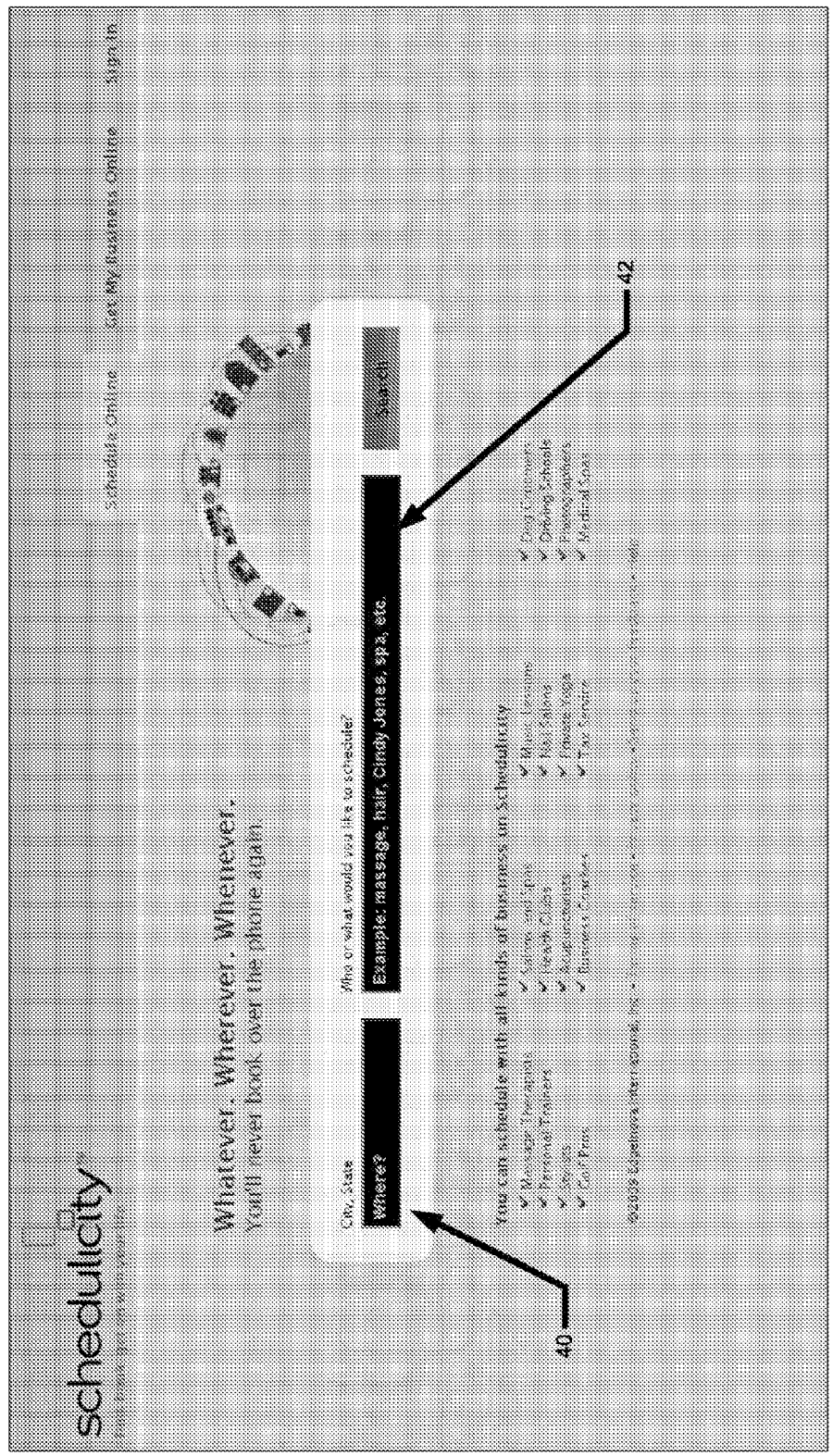
FIGS. 3-8 and 13 are example screen shots of the web interfaces that may be provided to a customer seeking to schedule an appointment through the online appointment scheduling service according to various embodiments of the present invention.

FIGS. 3 through 8 show example screen shots that a customer end user 14 might see and interact with when scheduling an appointment through the web interface provided by the data center 12. The screen shots in this example are from web pages provided by the data center 12 that the customer end user 14 may render using web browser software on the customer's end-user device (e.g., pc, laptop, smartphone, television, etc.). As shown in FIG. 3, at an initial web interface for scheduling a service or resource, the customer end user 14 may enter search criteria for locating relevant services. The search criteria may include a location search field 40 where the customer end user 14 may enter the city and/or state (or other geographically identifying information, such as zip code, area code, or GPS coordinates) in which the customer is looking for services. The search criteria also may include a key word search field 42 where the customer end user 14 may enter key words to be used in the search. The key word(s) may be, for example, the type of service sought (hair stylist, fitness center, massage, etc.), the name of a particular person who provides a sought-after service, or any other relevant key words. The customer end user 14 may use one or both of the search fields 40, 42 to search for relevant services/resources.

Figure 4:
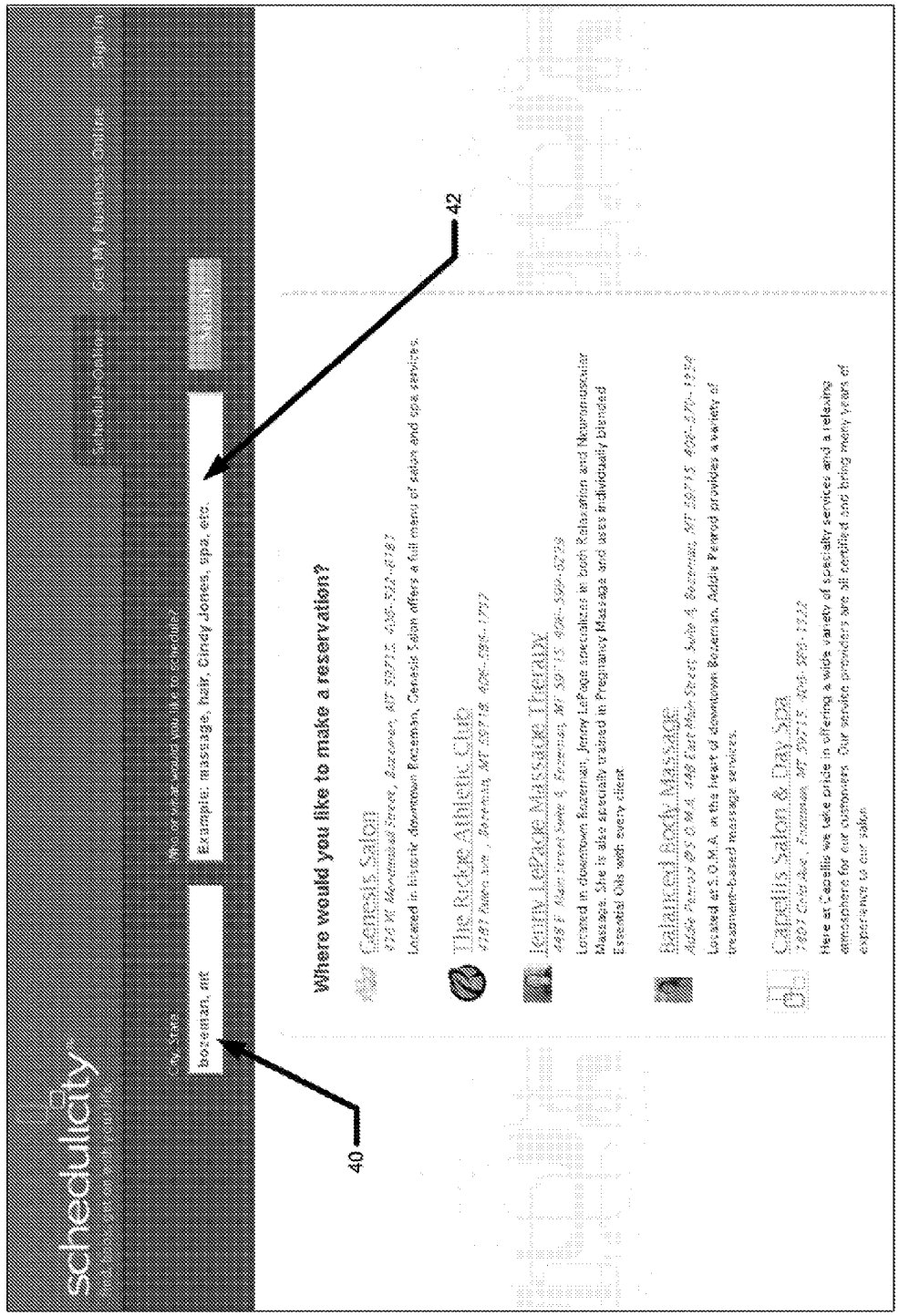

FIG. 4 is a sample screen shot of the web interface that displays the results from a search based on the search criteria entered by the user in fields 40, 42. In this example, the customer entered a particular city and state (Bozeman, Mont. in this example) in the location search field 40 and left the key word search field 42 blank. The results shown in FIG. 4 are businesses 16 that are part of the online scheduling network provided by the data center 12. For an embodiment using a multi-tenant business database 32, each of the businesses listed in FIG. 4 may have corresponding data in the business database 32 that is stamped or identified with an associated unique identification number for the business. For an embodiment of the data center 12 using multiple business databases 32 as shown in FIG. 1B, each of the businesses listed in FIG.

4 may have a corresponding business database 32 in the database system 24. The listing may contain the address for the business and a description of the services and resources offered by the business.

Figure 5:
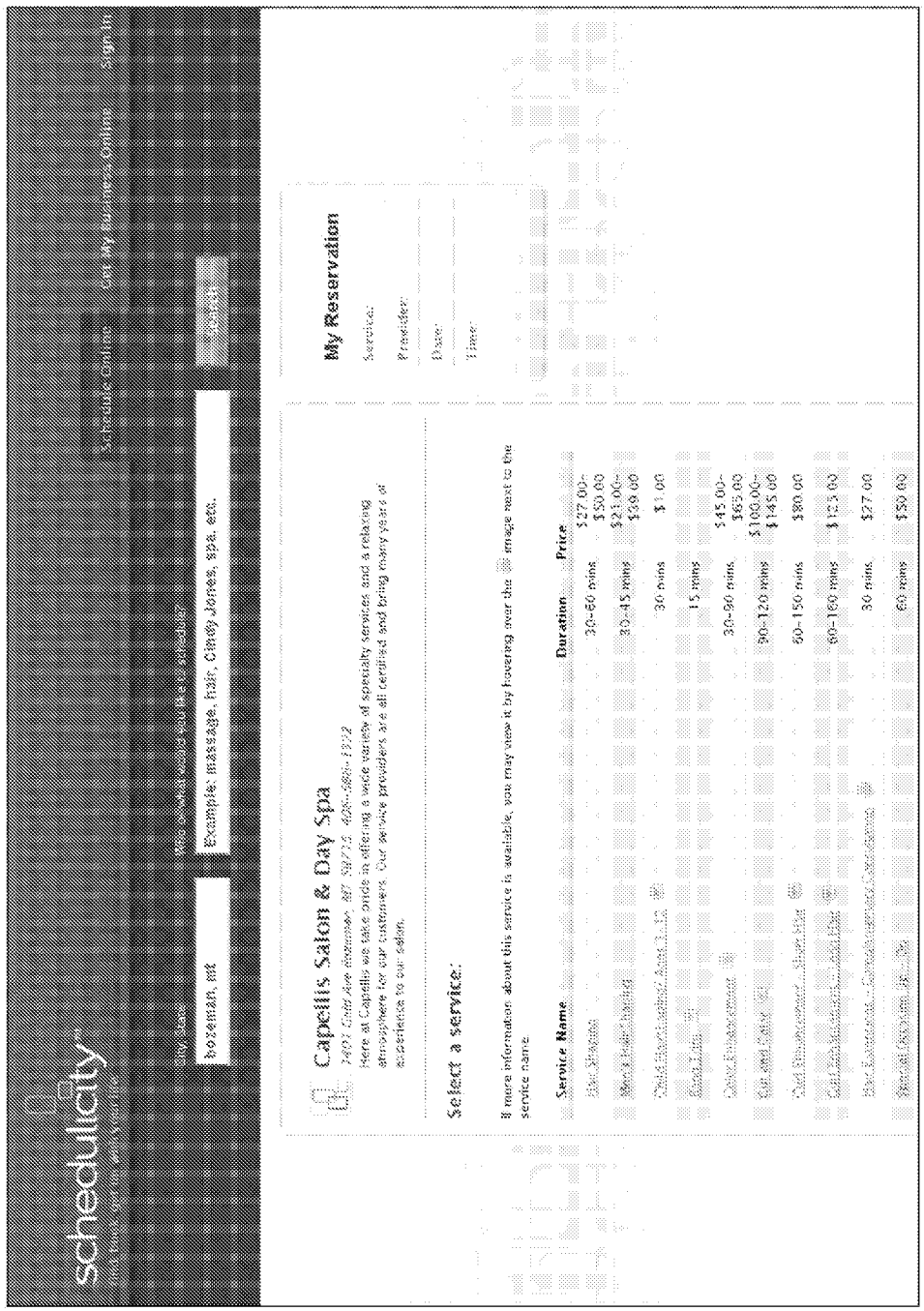
Figure 6:
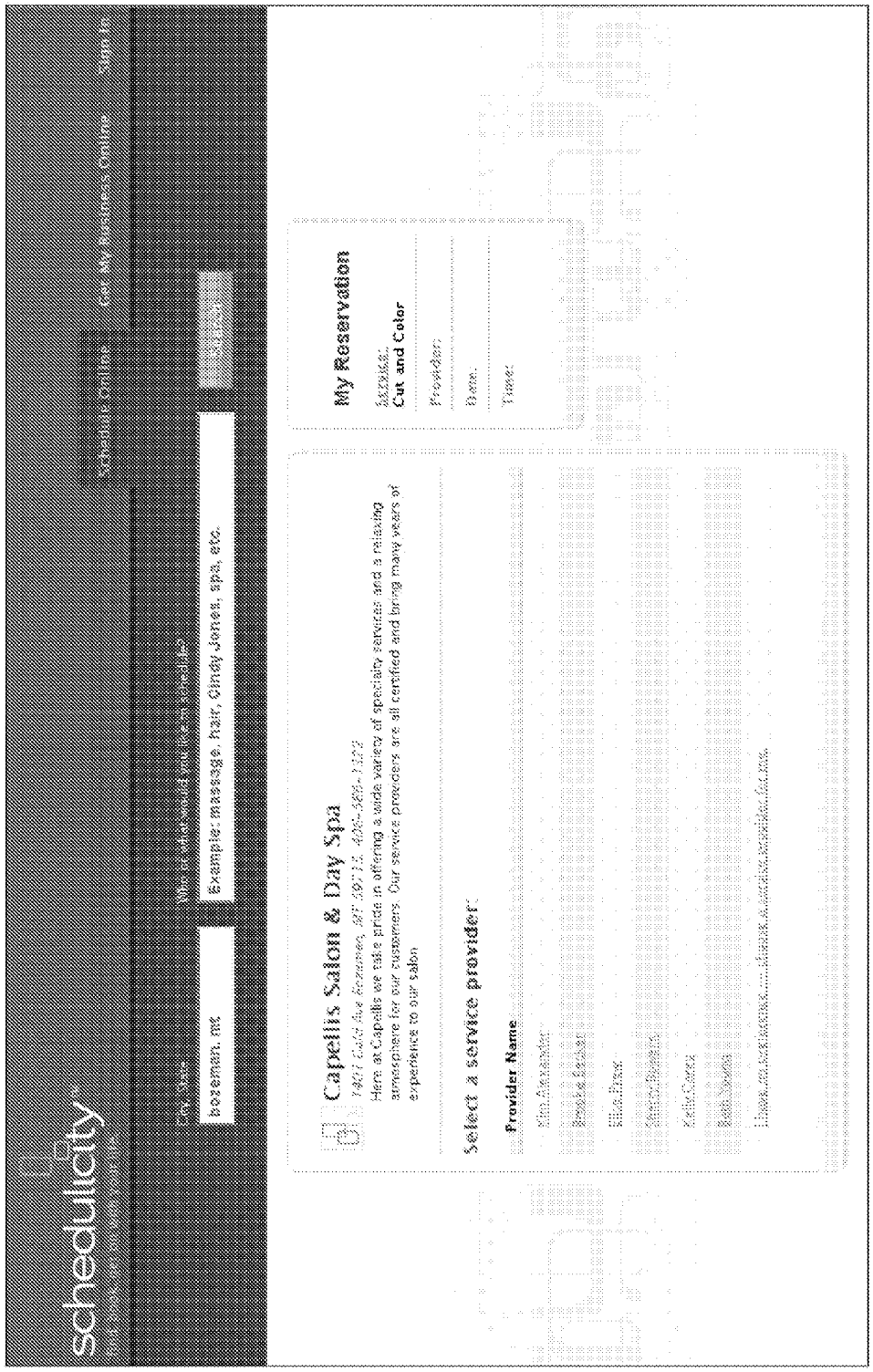

When the customer end user 14 selects one of the businesses, such as by clicking on or otherwise activating a hypertext link for the business, a list of the services and/or resources provided by the selected business may be returned to the customer, as shown in the example of FIG. 5. The listing may include the name for the service/resource, the duration range of the service or resource, and the applicable price (or price range). If the customer end user 14 selects (e.g., by clicking on) one of the offered services, a listing of the service providers associated with the business who perform the selected service may be listed, as shown in FIG. 6. That way, the customer end user 14 may select his/her preferred provider for the service. In addition, as shown in FIG. 6, the listing may include a "no preference" option, which allows the customer end user to schedule the service with any of the possible providers. In other embodiments, the customer may be able to specify the gender of the preferred service provider when they select the "no preference" option.

Figure 7:
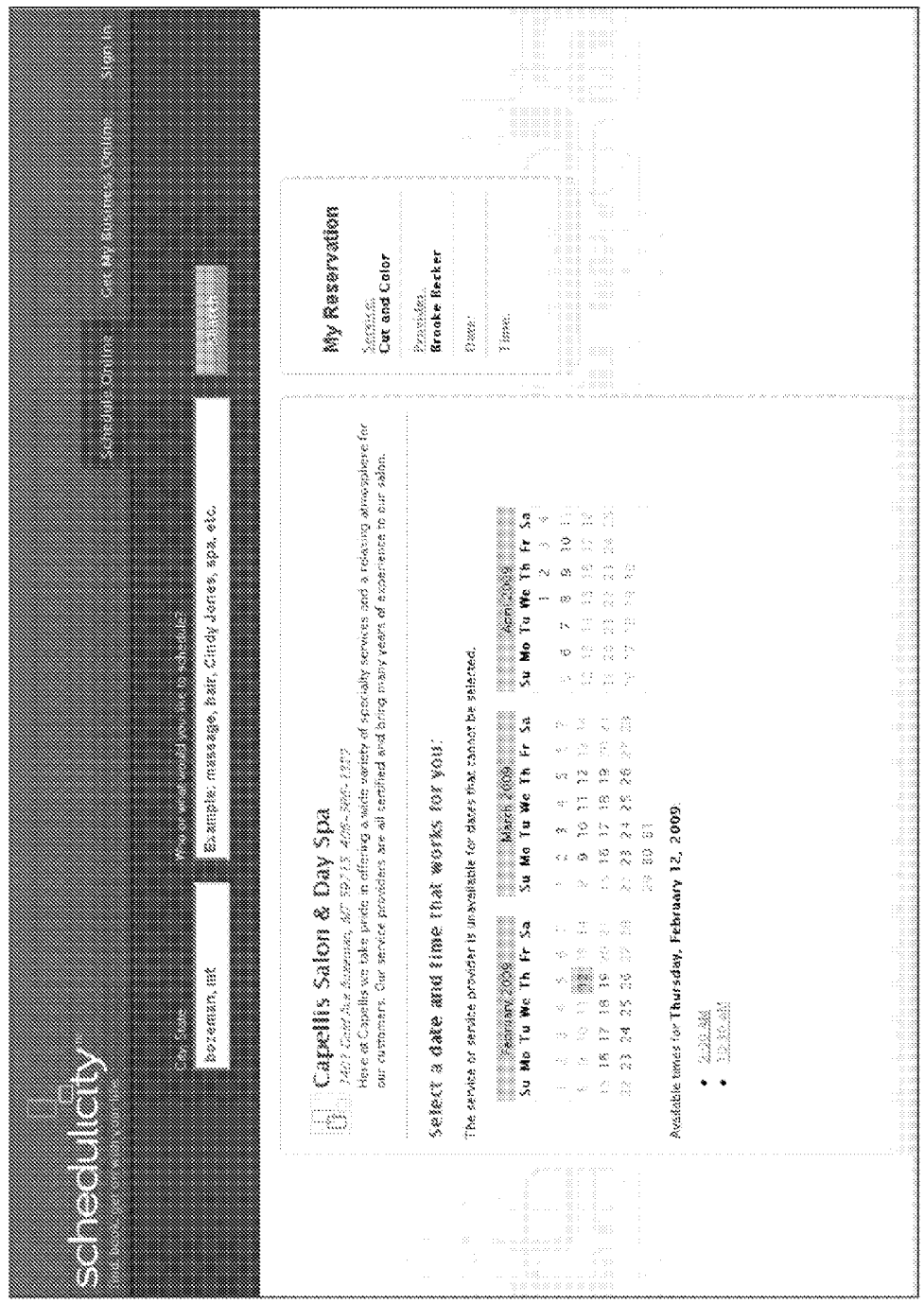

When the customer selects one of the providers, a calendar view may be presented through the web interface to the customer that indicates the dates that the selected provider is available to provide the selected service. The days that the selected provider is available preferably are distinguished from the days that the selected provider is not available in the calendar view provided to the customer in the web interface. For example, as shown in the example of FIG. 7, the days that the selected provider is available may be bolded (see March 2-5, for example, in FIG. 7) and the days the selected provider is not available may be non-bold (see March 6-8, for example, in FIG. 7). Of course, other coding schemes may be used to differentiate the available days from the non-available days. In various embodiments, when the user selects an available date (e.g., by clicking on the desired available date in the calendar view), available appointment times may be displayed for the customer, as shown in FIG. 7. In the illustrated example, the selected provider has appointment times available at 9:00 am and 10:30 am on the selected date (February 12) for the selected service.

Figure 8:
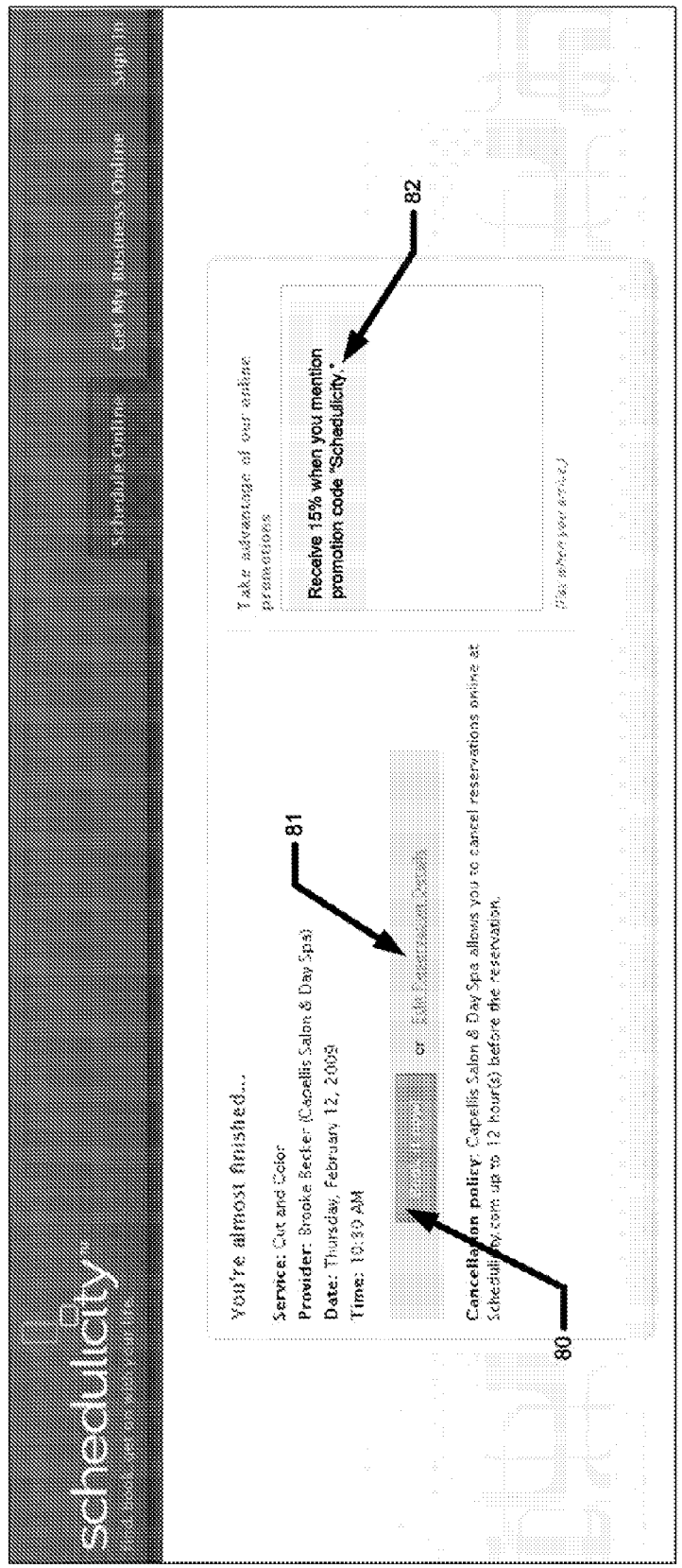

When the customer selects the desired appointment time, a confirmation process may be invoked as shown in the example of FIG. 8. The customer may book the appointment by activating the "Book it now" button 80 or the customer may edit the reservation details by clicking the link 81, which may return the customer end user to the display shown in FIG. 7, for example. The confirmation display, as shown in FIG. 8, also may include the service provider's cancellation policy. Further, a promotion field 82 may be displayed for the customer that may indicate applicable promotions available to the customer. The promotions may be coupons, etc. More details regarding promotions are explained below.

Assuming the customer already has an account with the online appointment scheduling service and has logged into the scheduling service provided by the data center 12, if the customer books the appointment, such as by clicking the "Book it now" button 80, a message may be sent to the customer by the data center 12 (e.g., by the database server 13 (see FIG. 1A) or the notification server 23 (see FIG. 1B)) as a reminder of the appointment. The customer's preferred means of communication may be stored in the customer's user account record in the customer database 30. For example, if the customer prefers email, an email may be sent by the data center 12 to the customer's email account with details regarding the booked reservation (e.g., time, place, provider, service, etc.). The email in various embodiments may include a calendar object that the customer can place on his/her electronic calendar, such as Microsoft Outlook calendar or other similar desktop or online software calendar applications, including web-based calendars as well. In various embodiments, the data center 12 may interface with web-based calendars via API, and the iCal format may be used for desktop application calendars. In addition, the appointment may be placed on the customer's personalized online appointment schedule that the customer can view through the web portal provided by the online appointment scheduling service. That is, each registered customer end user 14 may have a personalized web page hosted by the data center 12 that, for example, shows the customer's appointment schedule, allows the customer to edit or update their profile information and configuration preferences, shows the customer's reservation history, lists the customer's favorite service providers and/or businesses, and includes any other relevant information and functionality. The online appointment schedule may show all of the appointments that the customer has booked with businesses registered with the online appointment scheduling service, including appointments booked online by the customer (referenced to sometimes herein as "self-scheduled" appointments) and appointments booked by other means with the service provider or business, including by phone or in-person (referred to herein sometimes as "business-scheduled" appointments or "behind-the-counter" scheduled appointments).

Figure 9:
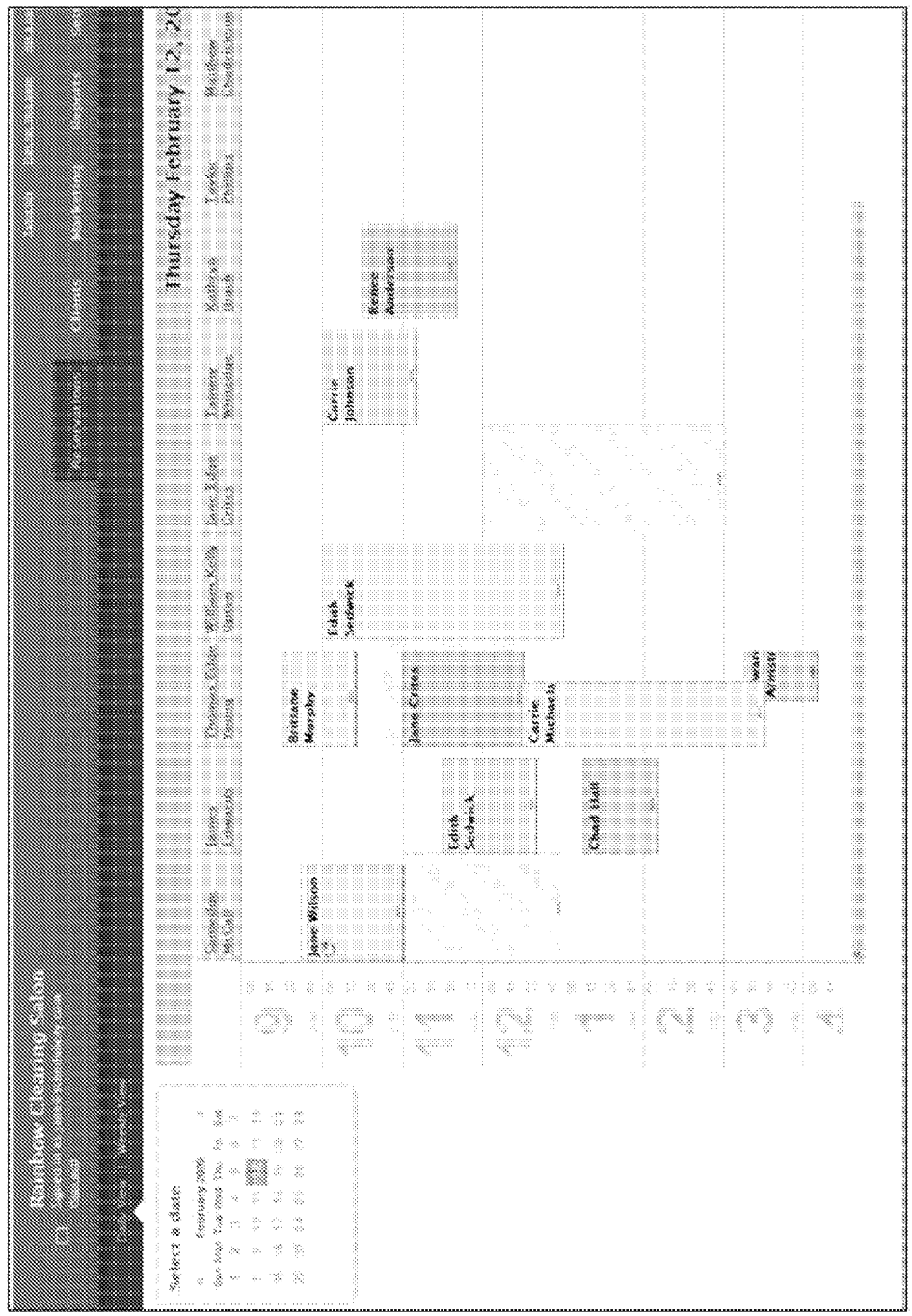
FIG. 9 is an example screen shot of a web interface that may be provided to a business end user that shows an appointment calendar for the business using the online appointment scheduling service according to various embodiments of the present invention.
Figure 13:
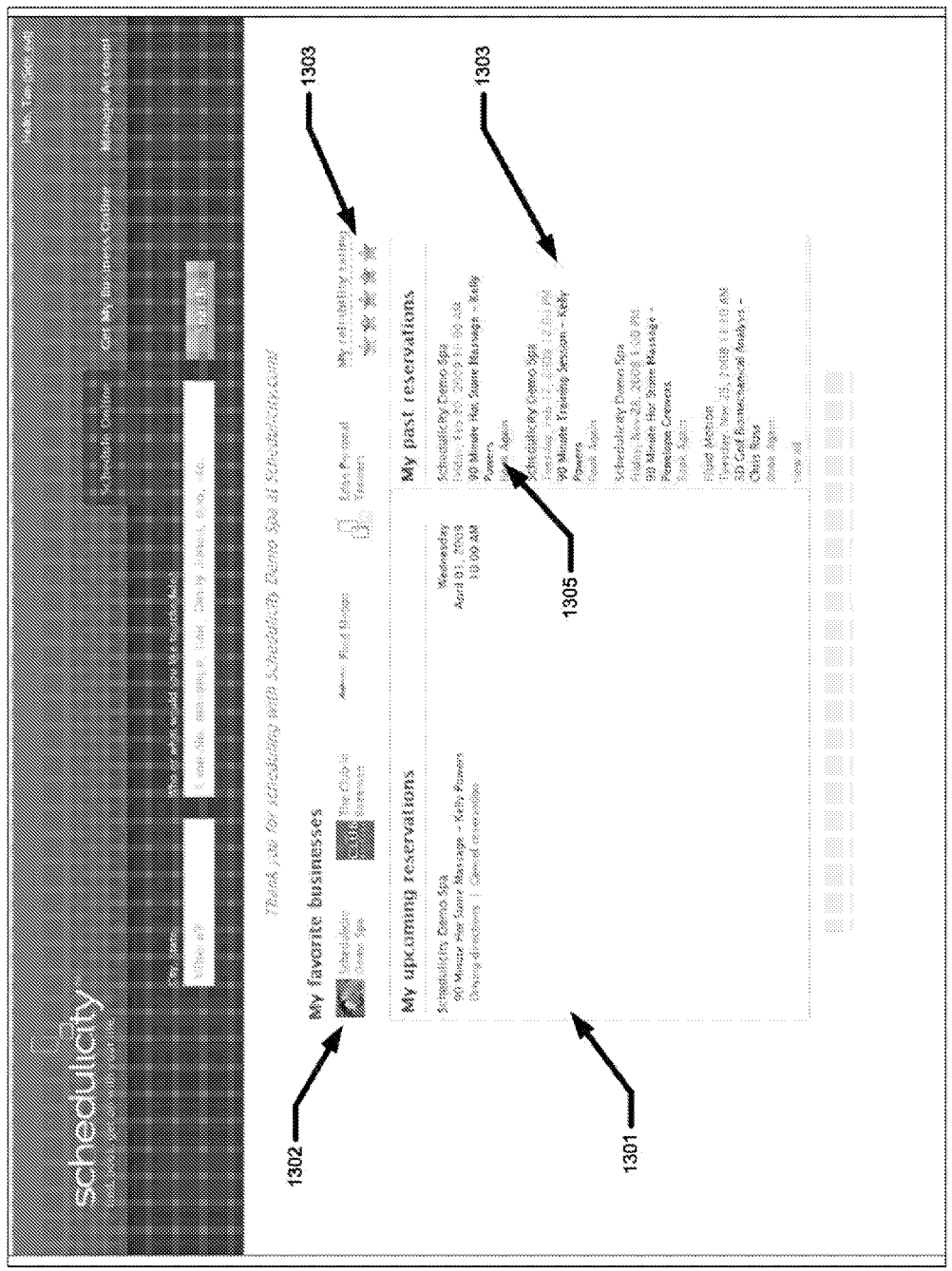

When the customer books an appointment, the appointment will appear not only on the customer's appointment calendar, as shown in the example customer web interface of FIG. 13, but also on the business's online appointment calendar, on the business web portal provided by the data center 12, an example of which is shown in FIG. 9. An example customer schedule, shown in FIG. 13, identifies the customer's upcoming scheduled appointments in an upcoming reservation field 1301. In addition, the customer's schedule page may identify some of the customer's favorite businesses in a favorite business field 1302. The customer could click on one of the business to initiate the appointment scheduling process for that business. For example, clicking on one of the favorite businesses' corresponding links may return the customer to the example interface shown in FIG. 5 to schedule an appointment for the selected business.

In addition, the customer's schedule page may show some past reservations of the customer in a past reservation field 1303. The customer could click on the "Book Again" link 1305 for one of the past reservations in the past reservation field to schedule a new appointment for that service, as described in more detail below. For example, clicking on the "Book Again" link 1305 for one of the past reservations may return the customer to the example interface shown in FIG. 7 to schedule an appointment at the same business, with the same service provider, and for the same service as the selected past reservation.

In addition, the customer's schedule page may show the customer's reliability rating 1310. More details about the reliability rating are provided below. In the illustrated embodiment, the reliability rating system uses a five-star system, with the greater the number of stars indicating greater customer reliability. In the example illustrated in FIG. 13, the customer has a five-star reliability rating. As described further below, businesses may have customized, pre-established minimum reliability rating thresholds for customers seeking to make online appointments.

As shown in the example of FIG. 9, the business schedule for a business may provide details regarding the appointments for the business. For example, for each appointment, the business schedule may identify, where applicable: the customer; the starting time; the duration of the appointment; the service provider for each of the appointments; etc. Various coding schemes, such as color codes, may be used to indicate the type of service to be provided for the various appointments or for any other purpose assigned by the service provider to a color code. The online business calendar preferably displays self-scheduled and business scheduled appointments (including reservations made by phone and in-person or other non-self-scheduled reservations). To enter business-scheduled reservations, the business end user 16 may log into the data center 12 via the network 18 and specify via the business interface (after being authenticated as a business end user) the details of the reservations, including the service provider, the date, the type of service, the start time, the duration, etc. The business end user 16 may specify the reservation details for such behind-the-counter scheduled appointments in a manner similar to the manner in which the customer end user books online appointments shown in FIGS. 5-8, including specifying the service provider, the date, type of service, the start time, the duration, etc. through various web pages. In other embodiments, a pop-up window may be displayed for the business end user when the user clicks a time slot for a particular service provider in the calendar. Through the pop-up window, the business end user may specify the client and the service (with the time and the service provider already selected) for the business-scheduled appointment. In addition, if a customer misses a scheduled appointment, whether self-scheduled or business-scheduled, the business end user, via the business web portal provided by the data center 12, may flag the reservation as a no-show. The no-show by the customer may be stored in the database system 24 and used in the determination of the customer's reliability rating, as described further below.

Figure 2:
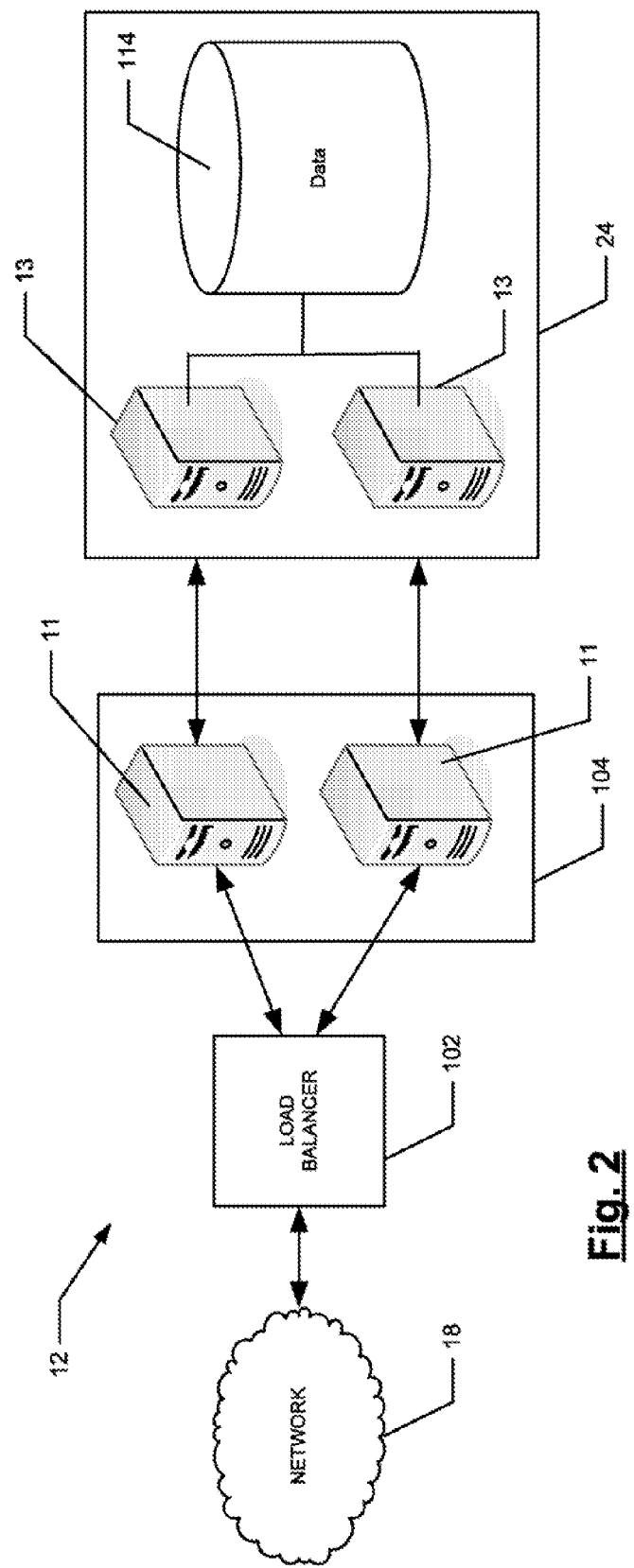

FIG. 2 is a diagram of the data center 12 according to another embodiment. As shown in FIG. 2, the data center 12 may comprise a load balancer 102, a server farm 104, and the database system 24. The server farm 104 may comprise one or more, and preferably two or more, electronic, networked, computer-based web servers 11. One server may provide redundant services for load balancing and reliability purposes. Load balancing among the servers 11 of the server farm 104 may be provided by the electronic, computer-based load balancer 102, which may be implemented, for example, as a multilayer switch.

The database system 24 may comprise two or more database servers 13 and a network of digital data storage devices 114. The data storage devices 114 may comprise disk arrays, although other suitable electronic data storage devices may be used, such as tape libraries, etc. A storage area network (SAN) 114 may be used to connect the data storage devices 114 to the database servers 13. The data storage devices 114 may store data for a number of databases, including, for example, the customer database 30 and the business database(s) 32. The database servers 13 may provide database services for the data stored on the data storage devices 114 to other computer programs and computer devices of the data center 12. Computer programs may run on the database servers 13, on the servers 11 of the server farm 104, or other computer devices of the data center 12. According to various embodiments, one of the database servers 13 may serve as an active node and the other server may serve as a passive node. In other embodiments, the database system 24 may employ network attached storage (NAS) or storage area network (SAN) so that the database servers 13 may request a portion of an abstract file from the data storage devices 114 rather than a disk block request.

In various embodiments, the data center 12 may calculate a numerical reliability rating for each customer end user 14. In various embodiments, a customer's reliability rating may be updated by the data center 12 each time the customer seeks to make an online or self-scheduled appointment. The reliability rating may be indicative of the reliability of the customer in meeting his/her scheduled appointments with businesses registered with the online appointment scheduling service, not just the particular business with which the customer is seeking to make an online appointment. The reliability rating may be based on both self-scheduled and business-scheduled appointments according to various embodiments. Business end users 16 may establish reliability rating thresholds for customer end users 14 seeking to make on-line (e.g., self-scheduled) appointments. The reliability rating thresholds for each business may be stored in the business database 32. When a customer end user 14 seeks to make an online appointment through the data center 12, the data center 12 (e.g. the customer web server 20 or some other computer of the data center 12) may retrieve the customer's rating from the user account data for the customer stored in the customer database 30 and compare it to the business's reliability rating threshold. If the customer's reliability rating is below the threshold, the customer may be prevented from booking an online appointment. Instead, the customer may be provided a message via the web interface from the data center 12 inviting the customer to call or otherwise contact the business directly to make the appointment. In addition, in various embodiments, the data counter 12 may send a notification to the business with which the customer was seeking to make an online appointment when blocked because of their reliability rating so that the customer may be made aware of the issue. For example, rather than waiting for a call from the customer, the business could contact the customer directly. In various embodiments, each customer's updated reliability rating may be stored in their user profile in the customer database 30 and/or in a short term computer memory of the data counter 12.

In one embodiment, a customer's reliability rating is based on the ratio of the customer's reservations not marked as no-shows to the total number of the customer's reservations over a period of time. The resulting ratio (or percentage or score) may be mapped to a rating level (or bucket) that is the reliability rating. In one embodiment, the mapping may be as follows:

| Score | Rating |
| --- | --- |
| 91% to 100% | 5 |
| 84% to 90% | 4 |
| 77% to 83% | 3 |
| 70% to 76% | 2 |
| 63% to 69% | 1 |
| ≦62% | 0 |

Of course, in other embodiments different ranges and/or a different number of ratings may be used.

In various embodiments, a new customer end user 14, i.e., a customer who has not previously scheduled an appointment through the online appointment scheduling service, may be assigned the highest rating. That way, the new customer can make an initial online appointment and not be subject to the business's rating threshold. In various embodiments, therefore, the customer's score may be calculated using the following algorithm:

$$\text{If } R < N, \text{ then Score} = \frac{N - R + M}{N}$$

$$\text{Else, Score} = \frac{M}{R}$$

where:
R is the number of appointments made by the customer over the historical time period (including both self-scheduled and business-scheduled appointments, and including both made and no-show appointments);
M is the number of made (or non-no show) appointments over the historical time period; and
N is an arbitrary positive number.

In order that first-time customer end users have an initially high reliability rating and so that their reliability rating does not react greatly to a small number of missed appointments early in their registration period, N may be considered to be a number of initial, awarded made appointments. In one embodiment, N equals twelve (12), although this number is configurable. That way, the reliability score for a first time customer end user is 100% (or a rating of five using the above example), and if the customer misses their first appointment, their rating drops to 0.917% (11/12).

The applicable historical time period may be a rolling time window, such as the prior T months (such as thirty-six (36) months or some other number of months). Using the above example, a business may set its threshold reliability rating to a rating between 1 through 5 inclusive. In various embodiments, the customer must have a rating that is equal to or greater than the business's threshold to make an online self-scheduled appointment. Each appointment may be equally weighted in computing the score, although in other embodiments, appointments may have different weights when calculating the score. For example, more recent appointments may be weighted greater than appointments that are not recent. In addition, some clients may override the reliability rating feature and either permit or deny online appointments on a case-by-case basis.

A customer's reliability rating may be calculated by one of the computer devices of the data center 12, such as the web server 11 or the database server 13, or some other computer device of the data center 12. The computer device that calculates the customers' reliability ratings may have a memory device or circuit (e.g., a ROM) that stores instructions which when executed by a processor(s) of the computer device, causes the processor(s) to calculate the reliability rating for customer end users 14 and compare the customer's rating to the appropriate business's threshold in determining whether the customer is entitled to make the online reservation.

According to various embodiments, the data center 12, upon being configured to do so by a business, may optimize automatically the online scheduling of appointments for a business. For example, the data center 12 may execute an optimization algorithm that limits gaps in the schedules of service providers of the business by controlling the start times presented to customer end users 14 via the web interface (see FIG. 7, for example). The optimization algorithm may consider blackout periods (e.g., time periods where no services/resources are available from the service provider and/or business) and scheduled classes when determining the times presented to the customer end user 14. In various embodiments, the optimization algorithm attempts to cluster new appointments to existing appointments in the calendar of the service provider, thereby avoiding the problem of an online customer end user 14 selecting a start time for an appointment that is in the middle of an availability period, leaving potentially unusable time gaps before and/or after the new appointment (i.e., time gaps that cannot accommodate any other service).

In various embodiments, the optimization algorithm is executed by a computer device of the data center 12, such as the web server 11 or the database server 13. Software code for executing the algorithm may be stored in a memory device or circuit of the computer device that executes the algorithm. The data center 12 may apply the algorithm after the customer end user 14 chooses a service, service provider, and date for the appointment. The algorithm also may be applied when no service provider is selected (e.g., the customer chooses "I have no preference," see FIG. 6). As such, the algorithm may be able to accommodate a single or plurality of service providers associated with a business as input.

According to various embodiments, the algorithm has several configurable parameters, such as which rules are applied (i.e., should appointments, blackout periods, or classes be considered when determining what to cluster to), the order in which the rules are applied, and the total number of times that should be presented to the customer (i.e., the algorithm may discover eight valid start times, but the business may choose to only ever present five maximum to a customer). The algorithm may also be configured to allow the business to prefer certain periods of the work day, such as morning, mid-day, or afternoon appointments (e.g., always show morning appointments first until none remain, then show afternoon appointments). In various embodiments, the optimization settings are applied at a business level, although in other embodiments, the algorithm allows service and/or service provider-specific configurations.

The service or resource availability periods for a service or resource may be the available period(s), on the appointment date, that a service provider chooses to offer their services. This availability is dynamic and changes based on factors that include: (i) the start and end times of the working day for the service provider; (ii) periods made unavailable in that working day (e.g., because of breaks, lunch, training, etc.), (iii) holidays for the business or service provider, and (iv) existing appointments scheduled on that working day. The "slot interval" may be the minimum unit of time a service or resource can be scheduled (e.g. 15 minutes). All acceptable start times are chosen on the boundaries of multiples of this unit. For example, if a resource has a slot interval of 15 minutes and starts work at 8:00 am, the initial pool of acceptable start times for a service is 8:00, 8:15, 8:30 etc. If a 27 minute service is scheduled at 9:00 am, the next acceptable time would be 9:30 am (and 3 minutes between 9:27 and 9:30 am becomes un-schedulable). In such an embodiment, 9:28 would not be presented as an acceptable time. (Note: a one-minute slot interval means that no period would become un-schedulable.) The acceptable times are the times the service provider wishes to offer their services and are chosen from slot intervals within the resource availability periods. As described below, the acceptable start times that are presented to the customer may be selected based on factors that include: (i) the resource availability periods; (ii) the slot interval; and (iii) the duration of the requested service.

Figure 10:
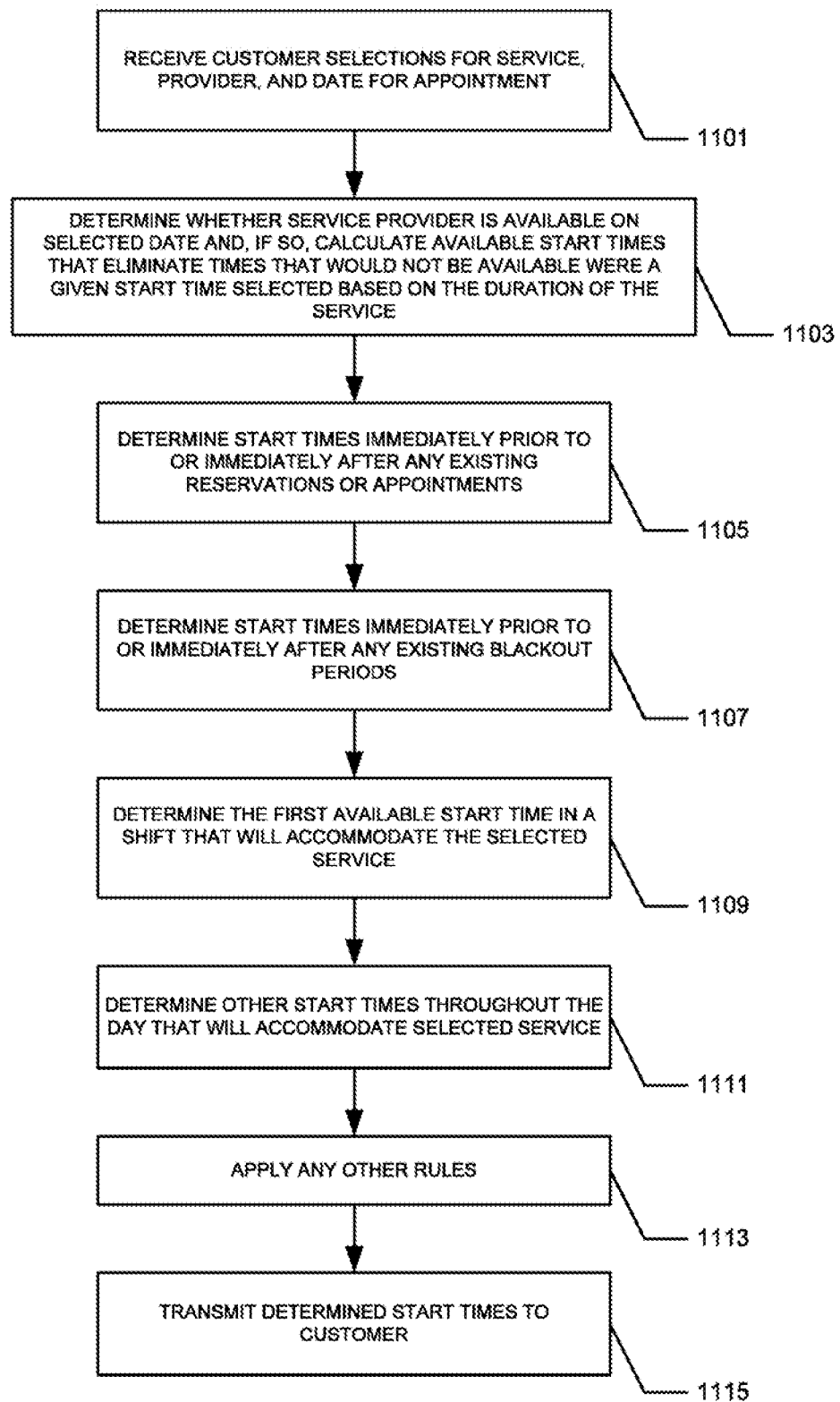
FIG. 10 is a diagram of the process flow of the optimization algorithm according to various embodiments of the present invention.

FIG. 10 is a diagram of the process flow of the optimization algorithm according to various embodiments. At step 1101, the data center 12 (e.g., the web server 11) receives via the network 18 the customer end user's selections for the service, service provider (if any), and date for the desired appointment (see FIGS. 5-7, for example). The optimization algorithm may then execute a number of rules to determine the appropriate list of acceptable starting times for the customer. For example, at step 1103, the database server 13 (or other computer device of the data center 12 executing the optimization algorithm) determines if the service provider is available on the selected day and, if so, calculates available start times using the selected service's duration (stored in the business database 32, for example) to eliminate times that would no longer be available were a given time selected. For example, a 60-minute service with a start time of 8:00 am eliminates 8:15 am, 8:30 am, and 8:45 am as available start times (assuming 15-minute scheduling increments or slot interval). In various embodiments, the business and/or service provider(s) may configure the desired scheduling increment(s) when they establish a business profile for the online appointment scheduling service, and those configurations may be stored in the business database 32, for example. The business and service providers also may configure work day start and end times as well as closed days, which also may be stored in the business database 32 and considered when the optimization algorithm determines availability for a given date.

Next, at step 1105, the database server 13 may determine start times immediately prior to or immediately after any existing reservations or appointments for the selected service provider. For example, if there is an existing appointment from 9:30 am to 10:30 am, the immediately prior and after start times that are acceptable for the 60-minute appointment given the existing appointment are 8:30 am and 10:30 am. Next, at step 1107, the database server 13 may determine start times immediately prior to or immediately after any existing blackout periods. This may be done in manner similar to which the start times immediately prior to or immediately after any existing reservations or appointments are determined at step 1105. The blackout times of the business and/or service provider may be stored in the business database 32, for example. For example, if a business/service provider has a blackout period from 12:00 noon to 1:00 pm for lunch, the immediately prior and after start times that are acceptable for the 60-minute appointment given the blackout period are 11:00 am and 1:00 pm.

Next, at step 1109, one of the database servers 110, 112 may determine the first available start time in a shift that will accommodate the selected service. For example, if the business or service provider start time is 8:00 am, then 8:00 am is selected since it will accommodate the 60-minute appointment prior to the 9:30 am appointment. Next, at step 1111, other start times, spread throughout the day (considering the pre-configured start and end times and considering the business's pre-configured limit on the number of possible start times to present to the customer) are selected. In various embodiments, the other start times determined at step 1111 are determined randomly. In other embodiments, the other start times are selected to leave gaps that could fit the duration of other services offered by the service provider. For example, if an online customer sought a 60-minute appointment and there was an existing appointment at 9:30, the database server 13 may select 8:00 am over 8:15 am because an 8:00 am appointment would leave 30 minutes (9:00 am to 9:30 am) in which another appointment could be scheduled, whereas an 8:15 am appointment would only leave 15 minutes (9:15 am to 9:30 am), which may be insufficient for another appointment, considering the durations of the various services provided by the service provider. As such, the data center 12 may take into account the durations of the other services provided by the service provider and/or the popularity of the services provided when determining the other start times at step 1111.

At step 1113, other rules specified by the business or service provider, if any, may be applied to eliminate certain of the start times determined from steps 1105 to 1111. These other rules may include, for example, limits on the total number of appointments in one day, selecting morning appointments before afternoon appointments or vice versa, etc. For example, in various embodiments, service providers may be provided with the option of limiting the maximum number (n) of scheduled appointments they accept per day or configurable time period. Therefore, at the beginning of the day, the times offered will be wide open (per the regular optimization routines), but after the nth appointment has been scheduled for the day (or other time configurable time period), no more availability will exist for that time period based on the service provider's configured maximum appointment count.

Finally, at step 1115, acceptable start times determined from step 1103 to step 1113 may be transmitted via the network 18 and displayed for the customer end user 14 via the web interface provided by the customer web server 20 (see FIG. 7, for example).

The benefit of scheduling optimization is realized primarily by service providers who offer services of varying lengths. Other online scheduling packages attempt to address the "scheduling gap" issue by either: (a) allowing the business end user to specify the exact times at which a particular service can be scheduled; or (b) allowing the customer end user to modify the start time increments offered to the client scheduling online. The first strategy has drawbacks; for each service, the service provider must choose the days and times when that service can be scheduled. Beyond requiring a cumbersome initial setup, this approach is rather brittle when it comes to modifying the service provider schedule moving forward. The second strategy is more effective for service providers who offer services that are all of the same duration. For example, if the service provider offers only one-hour services, the option to modify the calendar to present start times on one hour increments reduces the scheduling gap problem—any remaining slot will always accommodate a scheduled service. This approach, however, fails as soon as the service provider offers a service that has a duration that does not exactly fit into the scheduling increments.

In various embodiments, certain of the optimization rules and pre-configured settings may be turned off or overridden for certain customers. For example, a customer account for a particular customer stored in the business database 32 for a business may list preferred times for appointments for the customer, or may specify time windows for appointments different from the open hours of the business. If the business database 32 flags the customer as a customer where special rules apply (or where certain optimization rules and pre-configured settings are turned off), the optimization algorithm may use these rules in determining acceptable start times for the customer. In addition, a business or service provider may disable the optimization process when configuring their settings. In such cases, every available start time may be presented to the self-scheduling customer end user 14.

The optimization algorithm may be executed by one or more programmable computer devices of the data center 12, such as the database server 13. A computer readable medium, such as a memory chip or other storage medium, may store the software code that, when executed by a processor(s) of the computer device(s) causes the processor(s) to execute the optimization algorithm.

As shown in FIG. 1, the data center 12 may support communications with customer end users 14 and business end users 16 from a variety of different end user devices, including personal computers, laptops, televisions, and mobile devices (including mobile phones with and without browsers). In various embodiments, the end user devices may comprise GPS or other navigational systems. In that connection, the end user devices may comprise a GPS or other type of electronic receiver circuit for receiving position signals and calculating the position of the device (e.g., GPS coordinates). For customer end users 14 with mobile devices with GPS or other navigational systems, the data center 12 may allow the customer end users 14 to search for services based on their GPS coordinates. That is, for example, in addition to allowing a customer end user 14 to type free text in a location search criteria field 40 (see FIG. 3, for example), the customer end user, in various embodiments, may be able to transmit their GPS coordinates to the data center 12 from their mobile device. The customer end user 14 may also transmit a "within distance" parameter or a default "within distance" parameter may be used. The data center 12, therefore, may search for relevant services/businesses within the distance parameter for the customer's GPS coordinates. The relevant search results may then be displayed to the customer (see FIG. 4, for example), and the customer can continue with the process of making an online reservation.

In addition to customer end users 14 being able to schedule appointments via mobile end user devices, in various embodiments the data center 12 (e.g., the web server 11) may provide a mobile web version for business end users 16 accessing the data center 12 via mobile end user devices. Using their mobile devices, business end users 16 may be able to manage their appointment calendars just as they can from non-mobile devices. For example, using the mobile web interface provided by the data center 12, the mobile business end users 16 may be enabled to, among other things: (1) log into the data center 12 and view their daily and weekly reservation calendars (see FIG. 9, for example); (2) view details of scheduled reservations (e.g., name and contact information of customer, service to be provided, start and end times, etc.); (3) cancel existing reservations; (4) create a new reservation for an existing client; and/or (5) create a block out time for a future time period for the service provider (e.g., a portion of a day, an entire day, a number of days, etc.) during which customer end users cannot self-schedule appointments with the service provider via the online appointment service. The data center 12 may consider these block out times when generating a list of acceptable start times for a customer end user 14 seeking to self-schedule an appointment with the service provider as described herein.

When a service provider cancels an existing appointment (regardless of whether the cancellation is made through a mobile web interface or a non-mobile web interface), the customer who had the appointment may be sent a notification automatically by the data center 12 (e.g., the database server 13). The notification may be sent via the customer's preferred notification means, which are stored in the customer database 30 (e.g., email, text message, etc.).

In addition, certain customer web pages, such as the customer home page (whether accessed through mobile or non-mobile devices), may display individualized promotions based on the location of the customer. For example, when a customer logs into their personalized home web site for the online appointment scheduling service, the data center 12 (e.g., the web server 11) may retrieve data regarding promotions from the database system 24 based on location-identifying information for the customer, which may be stored in the customer account profile for the customer in the customer database 30. Web pages from the data center 12, such as the home web page or other pages, may include promotional information specific to the customer's geographic information. The location-identifying information may include the customer's area code or zip code. In addition, the data center 12 may use the customer's IP address to determine the customer's geographic location based on an IP address-to-geographic location map in order to provide location-based promotions to the customer. In addition, the data center 12 may use the customer's GPS coordinates to provide location-based promotions to the customer. In addition, when a user types a location in the location search field 40 (see FIG. 3), subsequent web pages provided to the customer through the web interface provided by the data center 12 may include promotions based on the location specified by the customer in the search field 40.

Figure 11:
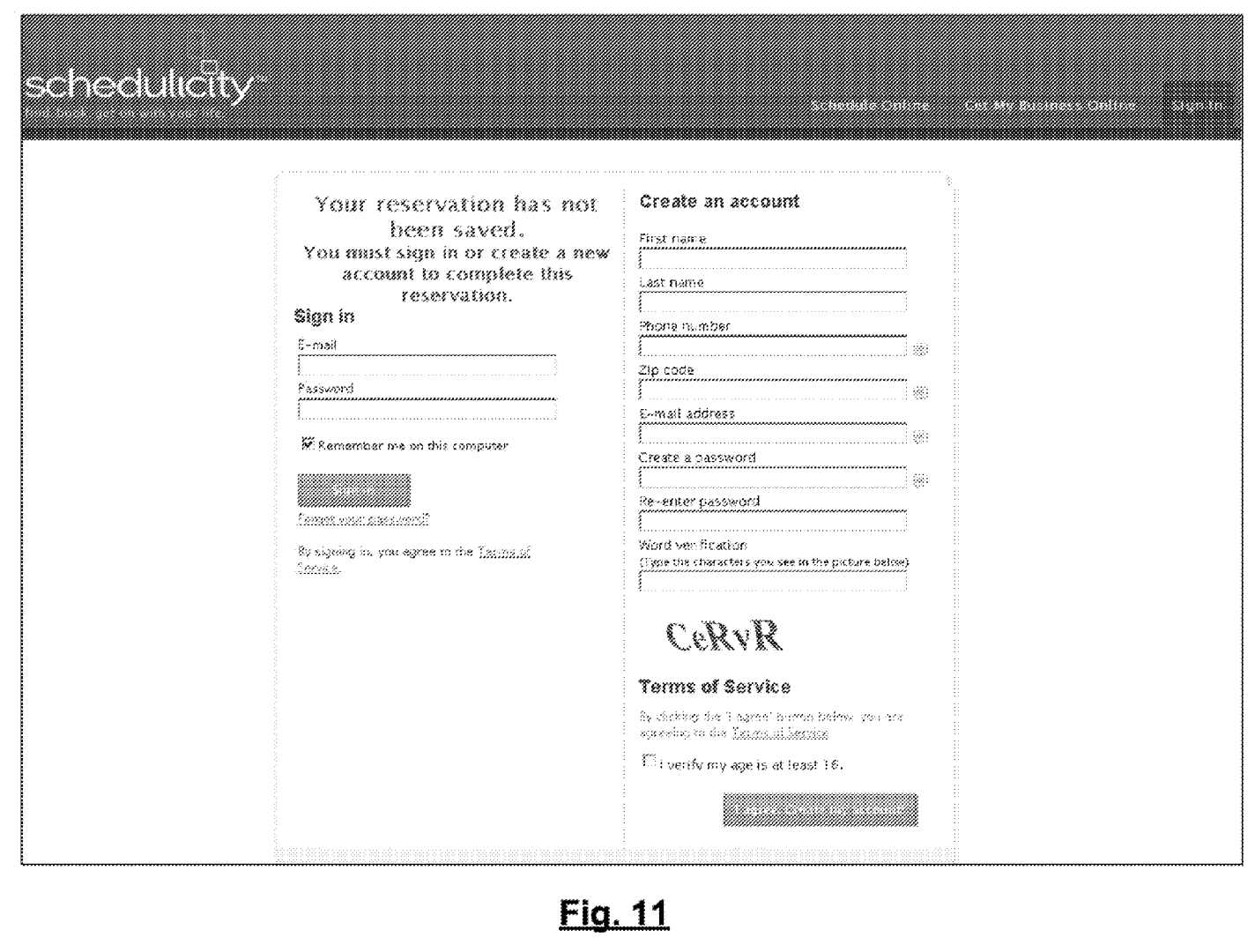

FIG. 11 is an example screen shot of web page provided by the web server 11 in which a customer end user 14 creates an account for the online appointment scheduling service. When the customer end user 14 creates their user account, the customer preferably provides certain demographic information, including name, phone number, e-mail address, and mailing address, as shown in the example of FIG. 11. Based on the provided address, the data center (e.g., the web server 11) may display a list of businesses in the online scheduling network that have postal codes in close proximity to the one provided by the customer end user 14. That way, the customer end user 14 can learn of local businesses who are part of the online appointment scheduling service and at which the customer end user 14 can make online reservations through the online appointment scheduling service. In an alternate embodiment, related businesses could be displayed based on area code proximity. In yet another alternate embodiment, related businesses could be displayed based on the IP address of the customer end user 14 using an IP address-to-geographic location map. The customer can click any of the corresponding hyperlinks of related businesses in the web interface to launch the scheduling process for that business (see e.g., FIGS. 3-8), with no additional search required.

In various embodiments, the online scheduling service provided by the data center 12 may provide a wait list functionality. According to various embodiments, when a service provider or service is not available at a time desired by a customer end user 14, the wait list function allows the customer end user 14 to request notification (or automatic booking) when a desirable time slot opens. The notification (if any) may be sent by the data center 12 (e.g., the database server 13 or the notification server 23) using a communication means specified in the customer's user account, such as email, text message, instant message, etc. If a time slot for the customer's desired service does not open by the desired appointment time, the wait request can either expire or remain open based on customer input. A wait request can be placed on a service (triggered when the first available provider who offers that service on a given date or date/time comes available) or a service provider/service combination (triggered when a specific service provider comes available to offer a selected service on a given date or date/time). The wait window can be configured by the customer (e.g., only alert/book if a specific date/time comes available or alert if an opening comes available within a specified date/time range).

The customer may manage their wait list requests across multiple businesses registered with the online scheduling network from the web portal provided to the customer by the data center 12. This allows customers to review the status ("active" or "expired," for example) of current wait list requests and cancel a wait list request if they no longer desire to be on that wait list. The customer can either add himself or herself to a wait list via the web portal or request that he/she be added to the wait list by contacting the business end user 16 directly.

In various embodiments, business end users 16 may configure their settings to be notified by the data center 12 when an appointment opening comes available for which a wait list exists. If configured to be notified, the business can then choose to either contact the customers on the wait list directly or initiate automatic notification by the data center 12 of the wait listed customers. In various embodiments, when a time slot for which a wait list exists opens, the time slot is not immediately made available for scheduling through the customer web portal; rather, customers on the wait list may have a right of first refusal for the time slot.

In various embodiments, the data center 12 may send a notification to wait listed customers of an opening simultaneously (or near simultaneously). If a wait-listed customer has requested e-mail notification, the e-mail can include details about the wait request and the number of other customers who are waiting for the same slot to foster a sense of urgency among recipients of the notification. If the customer has requested SMS notification, the notification may include enough information to notify the customer that their requested time slot is now available and instruct the customer to go to the customer portal to complete his/her reservation. Alternate forms of notification, such as outbound IVR (Interactive Voice Response) phone calls, instant messages, etc., may also be used.

In an alternate implementation, the data center 12 notifies each customer on the wait list in turn using a First In, First Out (FIFO) model, giving a specified period of time for each customer to respond before the offer to schedule the opening is withdrawn and extended to the next customer on the wait list. The notifications may use email, SMS, etc. In a situation where all of the customers on the wait list have been notified but have not booked the appointment in their designated time window, the data center 12 can either notify all customers at once to let them know that the slot is now available on a first-come, first-serve basis among the members of the wait list for a specified period of time before the opening will be released to the general public through the online appointment scheduling service or repeat the round-robin offering for a pre-configured number of times.

In still another alternate implementation, the data center 12 notifies each customer on the wait list in turn based on factors including the customer's reliability, current proximity, scheduling frequency, assigned client tag, and/or other factors or combinations of factors to determine the order in which customers will be notified.

The reservations of each customer end user 14 may be listed on the customer's personalized web portal provided by the data center 12 under the customer's reservation history, as shown in the example of FIG. 13, where past reservations are listed in the past reservation field 1303. A customer's reservation history may include both self-scheduled reservations (i.e., reservations made through the web portal) and business-scheduled appointments made on behalf of the customer by the business using the business portal provided by the business web service 22 in response to a phone call or in-person reservation request by the customer. Accordingly, from a single web site, the customer end user 14 has the ability to review his or her scheduled reservations, cancel upcoming reservations, and/or schedule past reservations again for any business that is a part of the online reservation network. Changes made by the customer (e.g., booking a new reservation or canceling an existing reservation) may be reflected in real-time on the schedule of the affected business end user 16 (see FIG. 9, for example). Similarly, appointment changes made affecting the customer by the business end user 16 (e.g., new reservations, cancelled/modified reservations) may be reflected on the customer's schedule the next time the customer logs in to his/her home page.

In addition, in various embodiments, the data center 12 may provide the business end users 14 with an option to invite (via e-mail, SMS, etc.) their existing customers to schedule appointments online via the web portal provided by the web server 11. In one embodiment, if a customer responds to the invitation, that customer's new or existing user account in the customer database 30 will be linked to the customer account in the business database 32. In addition, the first time a customer schedules online with a business via the online appointment scheduling service, the data center 12 (e.g., the web server 11) may compare the customer's e-mail address, first name, and last name against customer-related data (e.g., customer records) stored for the various businesses in the business database 32. If the data center 12 finds a sufficient match of these three data elements in the business database 32, the data center 12 may link the customer's user account in the customer database 30 to the customer record in the business database 32. Consequently, in various embodiments, no matter how the link is made between the customer user account and the business's customer record for the customer, the customer will see in their custom portal profile any existing reservation history on file with the business—even if the customer has never scheduled online with that business in the past.

According to various embodiments, the customer web portal may provide customer end users 14 with a streamlined process of re-booking past appointments without going through all of the steps described above in connection with FIGS. 3-8. In such embodiments, after a customer end user 14 has scheduled a reservation with a business through the online appointment scheduling service, that reservation is listed in the client's reservation history in the customer's profile (see the past reservation field 1303 in FIG. 13, for example). For each historical reservation, the web portal provided by the data center 12 to the customer may provide a "Book Again" hyperlink 1305 that, when clicked or otherwise activated, automatically selects the business, service, and service provider previously scheduled for the selected historical reservation and loads the date/time selection page of the web interface (see FIG. 7). That is, for example, by clicking the "Book Again" link 1305, the customer bypasses the steps of searching for the business, selecting the service, and selecting the service provider. At this stage, after clicking the "Book Again" link 1305, the customer merely needs to select the date and an available time, and confirm the requested appointment to complete the new reservation. This saves the customer several steps in the conventional scheduling workflow. The "Book Again" feature enhances client retention for businesses and/or service providers and is even simpler than the creation of the initial reservation.

Similarly, in various embodiments, the customer's personalized home page provided by the data center 12 may include a "favorite businesses" list for the customer, such as shown in field 1302 of the example of FIG. 13. After a customer end user 14 has scheduled a reservation with a business in the online appointment scheduling service, that reservation may be listed in the customer's reservation history in the customer's network user profile. As alluded to above, the customer reservations that are listed in the customer's reservation history may include both (a) those reservations that were self-scheduled by the customer through the online scheduling network and (b) those reservations that were scheduled on behalf of the customer by the business/service provider (e.g., in response to a phone call or in-person reservation request). Based on previous reservations, the data center 12 (e.g., the web server 11) may create a list of favorite businesses for the customer, with each business on the list having an associated link (e.g., hyperlink) in the web interface that, when activated by the customer end user 14, automatically loads the service selection page of the scheduling process (see, e.g., FIG. 5) for the selected business. In this manner, the process of selecting repeat service providers is simplified and customer end users 14 are encouraged to make additional reservations with the businesses and/or service providers with which they have existing relationships.

The list of favorites for a customer end user 14 may be determined by the data center 12 (e.g., the web server 11) based on the number of reservations the customer end user 14 has made with a business over a period of time. That is, the web server 11 may calculate the number of reservations a customer end user 14 has made with various businesses through the online appointment scheduling service, and those businesses that meet or exceed the threshold level may be listed on the customer's favorite businesses list.

As mentioned above, in various embodiments the data architecture of the data center 12 may store customer data in two separate locations: the first is the customer database 30 for customers who self-schedule reservations through the online appointment scheduling service; the second is the business database 32, which stores data for the businesses who use the online appointment scheduling service. Using this architecture, a customer can create a single user account with the online appointment scheduling service and then create reservations with any business in the online appointment scheduling service using that same credential. The data center 12 (e.g., the web server 11) attempts to automatically link the customer user account in the customer database 30 with any existing customer records in the business database 32 when the customer is making a reservation through the online appointment scheduling service by matching the customer's e-mail address, first name, last name, and/or other identifying data. If no match is found, the data center 12 creates a new customer account in the business database 32 for the selected business and links the customer's user account in the customer database 30 to that customer record. This matching mechanism helps reduce the creation of duplicate records in the business database 32 by attaching to existing records when possible. Service providers can also use a manual merge mechanism to combine customer records that are identified as duplicates.

The data center 12 (e.g., the business web server 22) also may include a mechanism that businesses and/or their service providers can use to invite their customers to schedule online through the online appointment scheduling service. By choosing an option in their configurations, the business can instruct the data center 12 (e.g., the database server 13 or notification server 23) to send an e-mail invitation (or other type of communication, including SMS, instant message, or IVR call) to every customer having a customer record for the business in the business database 32 who has an e-mail address (or other address, such as SMS or telephone number) on file and who has agreed to accept e-mail (or other) communications from the business. In various embodiments, the e-mail may include a hyperlink that, when activated, takes the recipient customer to a web page hosted by the web server 11 that contains information about the business. For example, when the customer clicks or otherwise activates the hyperlink, the web browser on the customer's end user device may launch the first page of the of the online scheduling process associated with the business (see FIG. 5, for example) and the data center 12 stores in memory (e.g., a memory device of the web server 11) the customer's information embedded in the hyperlink. At the end of the online scheduling process, the customer is prompted to either create a network user account to complete the reservation or log in with an existing network user account, such as shown in the example of FIG. 11. If the customer creates a new account, the data center 12 uses the customer information stored in memory to determine which customer record should be associated with the new client account. Likewise, if the customer logs in using an existing network account, the data center 12 uses the customer information stored in memory to link the customer record with the existing network account. Like the matching mechanism described above, this strategy reduces the creation of duplicate records in the business database 32.

As shown in the example of FIG. 11, in some embodiments a customer must first create a network user account to create a reservation through the online appointment scheduling service. That user account may be linked to a customer record/account in the business database 32 when the online reservation is created, as described above. Over time, that single user network account, stored in the customer database 30, may be linked to multiple customer records in business database 32 as the customer uses the same user account to schedule reservations through the online appointment scheduling service with various businesses. According to various embodiments, if the customer changes or updates his/her contact information in the network user account (stored in the customer database 30), that change or update can be pushed to the linked corresponding customer records in the business database 32 for the businesses that have customer records linked to the customer's network user account. That is, the customer records in the business database 32 may be updated to reflect the changes/updates instituted by the customer. This gives the customer the option to change his or her primary e-mail address, phone number, address, and/or other relevant information without disrupting the level of service he or she has come to expect from businesses with which the customer does business through the online appointment scheduling service.

As mentioned above, in various embodiments, the data center 12 (e.g., the database server 13 or the notification server 23) may (a) send automated confirmation messages to customer end users 14 and the scheduled service provider 16 for newly made appointments, (b) send automated reminder messages to the customer end users 14 prior to a scheduled appointment (such as one day prior), regardless of whether the appointment was self-scheduled or scheduled by the business, and/or (c) send automated cancellation notifications to the scheduled business end user 16 when a reservation is cancelled online by the customer end user 14. The customer end users 14 and business end users 16 may set their preferred mode of communication for such messages when they configure their accounts, and the configurations may be stored in the database system 24. For example, customer end users 14 and/or business end users 16 may configure their profiles to receive email, SMS, instant messages, or IVR phone calls for the notifications. In addition, in various embodiments, the data center 12 may post the notifications on social media sites (such as Facebook.com, MySpace, Twitter, etc.) based on customer configuration. These notifications may include a hyperlink or other mechanisms inviting friends and followers of the customer to schedule their own reservations at the same establishment or with another service provider registered with the online appointment scheduling service. The database system 24 may store the configurations for the customer end users 14 and/or business end users 16 and the addresses to which such notifications should be sent by the data center 12 (e.g., email address, SMS address, telephone number, etc.).

In addition, business end users 16 can choose to send-their own electronic notifications (e.g., email, SMS, instant message, etc.) when they edit or cancel reservations behind the counter (i.e., through the business web interface provided by the network). In addition, the business end users 16 can send targeted messages (e.g., email, SMS, instant message, etc.) to customers based on past reservation behavior of customers, including services and service providers scheduled, demographic information, or tags assigned in the business's customer recorded stored in the business database 32.

In various embodiments, because the online appointment scheduling service allows customers to make and manage reservations with disparate businesses across the online appointment scheduling service, the data center 12 has a more complete view of the client's scheduling activity at all times for the businesses that are part of the online appointment scheduling service. In one embodiment, the data center 12 uses this information to warn against double-booking of appointments when the customer schedules an appointment online by comparing the date/time of the new appointment against other pending, previously scheduled appointments for the customer (including both self-scheduled and business-scheduled appointments). The data center 12 (e.g., the web server 11) may be programmed to compare the date/time of the new appointment against the pending, previously scheduled appointments for the customer to detect a scheduling conflict. If a conflict is detected, the web server 11 may notify the customer end user 14 when the customer end user 14 attempts to book the new, conflicting appointment. For example, when the customer selects the option to book the new, conflicting appointment (see FIG. 8, for example), the customer end user 14 may be provided with a notice through the web interface that the new appointment that the customer is seeking to book conflicts with another existing appointment for the customer. The web interface may also provide mechanisms for resolving the conflict, such as canceling or changing either or both of the conflicting appointments or ignoring the warning and double-booking regardless.

In various embodiments, conflicting appointments may be detected where there is a time overlap between appointments. Further, conflicting appointments may be detected in some situations where appointments are near or adjacent in time and the geographic locations for the appointments prevent the customer from meeting the second appointment in a timely manner. For example, if a customer has two appointments scheduled with fifteen (15) minutes between the appointments, but it takes sixty (60) minutes to get from the location of the first appointment to the second appointments as determined by the data center 12 based on the geographic locations associated with the service providers for the appointments, the data center 12 may detect a scheduling conflict.

In another embodiment, the customer and/or the business end users can configure his or her network user account for the online scheduling network to integrate with other software calendar applications (such as Microsoft Outlook, Google Calendar, Yahoo! Calendar, etc.). That is, for example, the web server 11 may comprise software that allows customer and/or business network user accounts to integrate with such external software calendar applications. In such embodiments, the data center 12 (e.g., the web server 11) can compare proposed reservation dates/times against not only other appointments previously scheduled through the online scheduling network, but also against other personal appointments that are on file in the customer's or service provider's other software calendar applications. In this way, other types of scheduling conflicts can be detected instead of just conflicts between two appointments scheduled through the online scheduling network.

In yet another preferred embodiment, the customer can choose to allow business end users 16 to check the customer's network user account for conflicts when the business end users 16 schedule an appointment behind the counter on the customer's behalf. In this scenario, the data center (e.g., the web server 11) may check automatically for conflicts in the customer's schedule when a business end user 16 creates a reservation behind the counter during a walk-in or phone call reservation request. The conflicts (if any) may result from other appointments scheduled through the service or other appointments of the customer that the data center 12 can see through interfacing with a calendar application of the customer. In this way, the data center 12 can ensure that a booked reservation does not conflict with any other appointment the customer currently has scheduled, whether that reservation is scheduled with another service provider elsewhere in the online scheduling network or is a personal appointment on file in one of the customer's configured personal calendars. Preferably, the data center's software would be configured not to reveal details of the conflicting appointment to the business end user 16; instead, the business end user 16 would be notified only that a scheduling conflict existed. The customer end user 14 could configure whether or not they would allow the business end user 16 to schedule the conflicting appointment in this scenario.

In a related manner, the scheduling function of the online scheduling network may integrate with external software calendar applications so that the customer's external software calendar application may be updated with appointments made through the online scheduling network. For example, the customer end user 14 may configure their network user account to identify the external software calendar application used by the customer. The software of the data center 12 (e.g., web server 11) may be configured to update the customer's external software calendar application with appointments made through the online appointment scheduling service (i.e., self-scheduled appointments) or made behind the counter by the business end user 16. Because not all calendar applications are available online, in various embodiments the data center 12 may allow the customer to export reservation details for network-related appointments to the customer's offline calendar application using, for example, the standard iCal format or some other similar format. The customer may import the reservation data into their offline calendar application to update that calendar with the reservation information.

Figure 12:
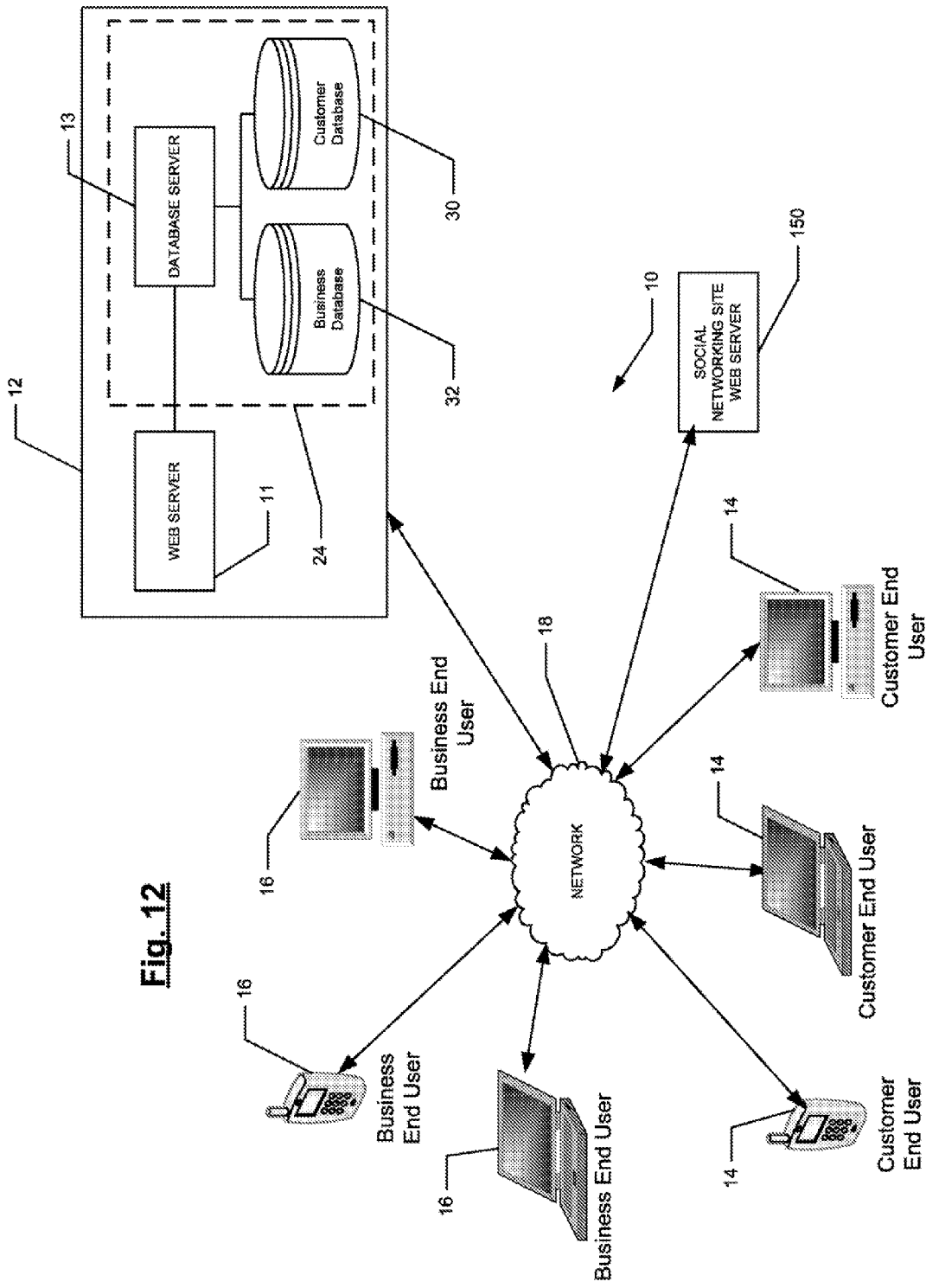

In addition, in various embodiments, customer end users 14 who use social networking sites to keep friends up-to-date on events taking place in their lives may post their reservation information directly from their online scheduling network portal page to such social networking sites as Facebook, Twitter, MySpace, etc. A social networking site may be hosted by a computer-based web server 150 in communication with the network 18, as shown in FIG. 12. According to various embodiments, posting of the customer's reservation information is initiated by the customer on a reservation-by-reservation basis. That is, for example, each time the customer completes the process of booking an online reservation through the online scheduling network (see FIG. 8, for example), the customer may be provided with a web interface from the web server 11 that asks the customer to provide necessary log-in credentials for each social networking site where the customer seeks to post the reservation information.

Using the customer-supplied log-in credentials, the data center 12 (e.g., the web server 11) may transmit the reservation data to the social networking site web server 150 via the network 18 for posting on the customer's social networking site. Depending on the destination social network, the posts can include rich functionality that allows others in the customer's social network to interact with the posted item. For instance, Facebook friends might be able to click a customer's posted reservation to schedule a reservation themselves through the online scheduling network. That is, for example, if a friend clicked on the link for the reservation information, the friend may be directed to a web site from the online scheduling network, such as the example web site shown in FIG. 5, where the friend can view the services provided by the business. In another scenario, a customer might post reservation information to invite other friends in the social network to join them for a particular event/appointment that is scheduled through the online scheduling network.

Figure 14:
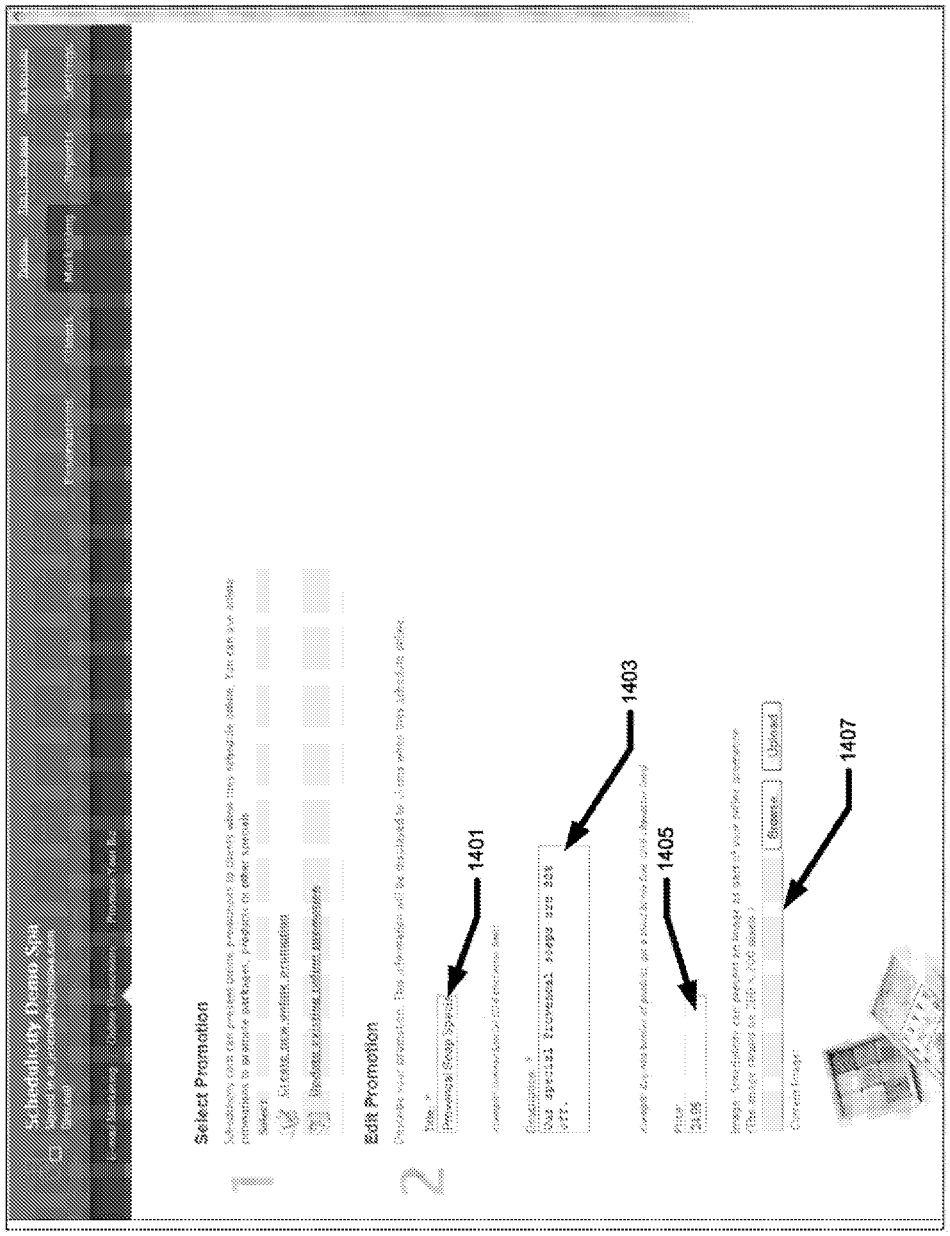
FIG. 14 is an example screen shot of web page provided by the data center in which a business end user may define a promotion for services offered through the online scheduling service according to various embodiments of the present invention.

To help businesses generate revenue, the online appointment scheduling service provided by the data center 12 may allow business end users 16 to define one or more promotions that are displayed by the online appointment scheduling service when customers schedule reservations through the online appointment scheduling service with the business. In one embodiment, the promotional information may be displayed at the end of the scheduling process, such as in the promotion field 82 shown in the web interface of FIG. 8. FIG. 14 shows an example web interface that may be provided to the business end user to set up a promotion. At creation of the promotion by the business end user 16, each promotion is assigned valid begin and end dates that determine the time window during which the data center 12 presents that promotion at the online scheduling network. The promotion data, including the start and end dates, may be stored in the database system 24. When a customer accepts a promotion at reservation time, the promotion data is associated with the reservation and displayed in the business's calendar (see FIG. 9, for example) to notify the business end user 16 that action may be required to prepare for the arrival of the customer (e.g., a particular product that is the subject of the promotion may need to be used in the performance of the scheduled service). The promotions may be associated with the scheduled business or service provider, or they could be associated with the scheduled service, for example. In addition, promotional information may be presented on the customer's personalized network profile page to encourage the customer to schedule a reservation. In addition, promotions may be used for cross-promotion; the online scheduling network may provide disparate businesses the option to cooperatively market by joining together when defining promotions and cross-selling those promotions to one another's customers. For example, a nail salon may cross-promote with a nearby hairdresser.

As shown in the example of FIG. 14, the business end user 16 may title the promotion in title field 1401, provide a description of the service in a promotion description field 1403, specify the price of the promotion if applicable in the price field 1405, and upload an image to be used in the promotion if desired in the image upload field 1407. This data may be stored in the database system 24 and used to creating and displaying the promotions presented to the customer end users 14.

When a business adopts the scheduling solution provided by the online scheduling network, one problem the business may face is the transition from their existing paper or electronic schedule system to the online scheduling network. Unless it is a brand new business, the business is likely to have a backlog of existing reservations already on their schedule that must be either imported into or manually created in the new scheduling system. If this step is not performed, the business risks accepting online reservations from the online scheduling network that will be double-booked with existing reservations that were not booked through the online scheduling network. In one embodiment, to address this problem, the data center 12 may allow adopting businesses to specify a date in the future (the "phase-in date") before which the business does not want to accept online reservations through the online scheduling network. That is, for example, as shown in the example of FIG. 15, when configuring the parameters for their business through the business web interface provided by the data center 12, the business may specify the phase-in date at field 1501. This date may be saved in the business profile for the business stored in the database system 24. This phase-in date value creates a buffer that allows the business to clear their backlog of existing reservations from their existing scheduling system without going through the hassle of data import or manual entry for all existing reservations. After the business goes live on the online appointment scheduling service, existing reservations may be managed out of the business's previously used calendar system while all new reservations (i.e., ones on or after the business-specified phase-in date) may be created through the online appointment scheduling service (whether self-scheduled or business-scheduled). In various embodiments, customers are able to self-schedule online reservations immediately, but only if the scheduled date falls on or after the phase-in date. In this way, the business buys the time it needs to clear its backlog of existing reservations while still allowing customers to begin immediately scheduling reservations online in the future through the online appointment scheduling service.

For example, if a new business end user 16 seeking to transition to the online appointment scheduling service provided by the data center 12 has a paper (or other) scheduling system that is currently 80% booked for the next three weeks, the transitioning business may set its phase-in date three weeks out. Provided the business has configured its network profile to allow online reservations up to at least four weeks in advance, customer end users 14 can begin scheduling appointments through the online appointment scheduling service for dates on or after the phase-in date. In the interim, the business may manage existing reservations from its existing scheduling system and can create new in-person and phone reservations through the online appointment scheduling service for services subsequent to the phase-in date. By the end of the third week, the business has completely transitioned its scheduling to the online appointment scheduling service.

When a business end user 16 configures its profile at setup time, the business end users 16, using a customer web interface provided by the business web server 22, may define a master list of services offered by the business, as shown in the example interface shown in FIG. 16. Attributes of each service on this list include duration (time required to deliver the service), price, cleanup time, and any other relevant attribute. The services and their attributes are stored in the business database 32 and associated with a service record for the service. When a particular service is associated with a particular service provider at the business, the business end users 16 may override the default values associated with the service to customize that service for each service provider. This structure allows the business to tailor a default service structure to the unique needs of each service provider.

For example, two different service providers at a hair salon business, Susie and Sally, may both provide cut-and-color hair services to their customers. However, Susie may be an experienced hairstylist who needs less time to deliver a cut-and-color but charges a premium because of her skill in comparison to Sally. The data center 12 may allow the business end user 16 to accommodate the disparate service attributes without defining a duplicate service record. So instead of defining two services—"Cut-and-Color with Susie" and "Cut-and-Color with Sally"—the business end user 16 may define a single service record—"Cut-and-Color"—and then customize the duration and price of that service when associating it with Sally and Susie. This keeps the list of services exposed to the customer through the customer web interface concise, and simplifies the overall scheduling process by hiding the complexity of the service menu from the customer.

In addition, in various embodiments, another attribute that a service provider may use to define their offered services is certain types of services that can be double-booked by customers. For example, some services may have time periods in the middle of the time period for the service where the service provider is available to work on another customer. For example, hair stylists (or other service providers) may provide services where a customer has significant processing time in the middle of the appointment during which time the hair stylist could work on another customer. In order for the service provider to make this open time in the middle of a first customer's appointment available to a second customer seeking to make an appointment using the online appointment scheduling service, in various embodiments the service provider may be able to define or configure such a service such that the data center 12, when calculating available start times for appointments, considers the open time in the middle of a prior scheduled service as being potentially available. For example, the data center 12 may enable service providers to configure a particular service as having multiple stages. The service provider may then configure certain stages as being available for double-booking by different customers. For example, a service provider may configure a service as having three thirty minutes stages, where the middle stage (e.g., Stage 2) is an open time for the service provider during which the service provider may service another customer. When the data center 12 calculates acceptable start times for a new customer seeking to make an appointment with the service provider, the data center 12 may consider the time for Stage 2 of the existing appointment as an open, available time slot. In this example, if the service provider offers a thirty-minute service (or a service having a thirty-minute stage), the data center 12 may consider and may offer the time that is slated for Stage 2 of the existing customer's appointment to the new customer if it accommodates the new customer's desired service time-wise.

In addition, in various embodiments, the optimization algorithm may suggest start times for a new appointment that has multiple stages to fit with an existing appointment already on the service provider's calendar. For example, assume Customer A has an existing 60-minute appointment with the service provider on a particular day starting at 9:30 am and that Customer B seeks to make a new appointment on the particular day, and the service sought by Customer B has multiple stages with one stage (e.g., the second stage) with a 60-minute down (or open or processing) time for the service provider. In this case, the optimization algorithm may be programmed to suggest a start time for the Customer B's appointment such that the second stage coincides with the existing appointment for Customer A. For example, if the service sought by Customer B has a 30-minute Stage 1, a 60-minute Stage 2 that is a down time for the service provider during which the service provider can accommodate another customer, and a 30-minute Stage 3, the optimization algorithm may suggest a start time of 9:00 am for Customer B's appointment. That way, the first stage will be from 9:00 to 9:30 am, the second stage will be from 9:30 to 10:30 am and during which the service provider can accommodate the existing 60-minute appointment for Customer A, and Customer B's third stage will be from 10:30 to 11:00 am.

In various embodiments, a service provider may always have the option to multiple book time slots using their reservation calendar (see FIG. 9, for example) behind the counter.

When a business end user 16 configures its profile for the online appointment scheduling service, the business end user 16 may configure the business hours for their establishment and working hours for each service provider offering services at that establishment. These configurations can be stored in the business database 32 for the business. Business hours can change over time, however; for instance, a service provider may decide he/she would like to work only mornings during the summer months and take afternoons off. In an online scheduling environment, this can be complicated because customers schedule weeks in advance. If an online scheduling system restricts the business end user 16 to only a single set of business hours, the business can never change their hours to impact future online reservations without also impacting their current business hours. In one embodiment, to address this problem, the online scheduling service provided by the data center 12 allows the user to specify a start date for a second, future set of business or service provider working hours. The data center 12 automatically may apply the second set of working hours for online reservations scheduled on dates after the date the second set of working hours take affect. The second set of working hours may be configured by the business end user 16 through the web interface provided by the data center 12 (e.g., the web server 11) and stored in the business database 32. The start date for the new hours may also be set and stored in the database 32. The customer web server 11 may take into effect these dates when scheduling reservations having a schedule date after the start date of the second set of business hours.

According to various embodiments, the present invention is directed to an apparatus, such as the system 10, that comprises a computer-based data center 12 for providing an automated computer network-based appointment scheduling service through which a plurality of customers registered with the service are individually capable of scheduling an appointment with one or more of a plurality of businesses registered with the service. The data center 12 may comprise one or more computer databases 30, 32 that store data electronically regarding the plurality of customers and the plurality of businesses. The data center 12 also may comprise at least one electronic computer device (e.g., web server 11) in communication with the one or more computer databases. The at least one electronic computer device is programmed to calculate a separate reliability rating for each of the plurality of customers that is based on at least, for each customer, (i) the number of non-no-show scheduled appointments by the customer with the plurality of businesses registered with the service over a historic evaluation time period and (ii) the total number of scheduled appointments by the customer with the plurality of businesses registered with the service over the evaluation time period.

The apparatus may further comprise: (i) at least one customer end user electronic communication device 14 in communication with the data center 12 via an electronic data network 18, wherein the at least one customer end user electronic communication device and the data center are programmed to communicate scheduling information over the electronic data network such that a user of the at least one customer end user electronic communication device is capable of scheduling an appointment for the user with one of the plurality of businesses registered with the service; and (ii) at least one business end user electronic communication device 16 in communication with the data center 12 via the electronic data network 18, wherein the at least one business end user electronic communication device and the data center are programmed to communicate scheduling information over the electronic data network such that a user of the at least one business end user electronic communication device is capable of scheduling an appointment for one of the plurality of customers with a business associated with the user of the at least one business end user electronic communication device.

According to various implementations, the scheduled appointments over the evaluation time period comprise both customer self-scheduled appointments and business-scheduled appointments for the customer. In addition, the reliability rating may be calculated based on the ratio of (i) the number of non-no-show scheduled appointments by the customer with the plurality of businesses registered with the service over the evaluation time period, to (ii) the total number of scheduled appointments by the customer with the plurality of businesses registered with the service over the evaluation time period. In addition, there are a plurality of possible hierarchical reliability ratings for each customer, and at least one electronic computer device may be programmed to calculate the reliability rating for each customer such that a customer has the highest possible reliability rating when the customer had zero scheduled appointments over the evaluation time period.

According to another embodiment, the present invention is directed to a computer-implemented method for providing an automated computer network-based appointment scheduling service through which service-registered customers are individually capable of scheduling an appointment with a plurality of businesses scheduled with the service. The method may comprise the step of receiving at a computer-based data center 12 via an electronic data network 18 an electronic communication from a service-registered customer 14 to schedule an appointment with a first business that is one of the plurality of service-registered businesses. The process may further comprise, comparing, by at least one electronic computer device (e.g., web server 11) of the data center 12, a reliability rating for the service-registered customer to a reliability rating threshold for the first business. The method may also comprise the step of booking, by the at least one electronic computer device, the appointment for the service-registered customer with the first business when the reliability rating for the service-registered customer equals or exceeds the reliability rating threshold for the first business. According to various implementations, the calculation of the reliability rating may be performed prior to the step of comparing the reliability rating for the service-registered customer to the reliability rating threshold for the first business. The calculation of the reliability rating may be performed after receiving the communication from the service-registered customer to schedule the appointment.

The method may further comprise the step of electronically transmitting by the data center 12 a confirmation notification to the service-registered customer when the appointment has been booked. In addition, the method may further comprise the step of electronically transmitting by the data center instructions to the service-registered customer to contact the first business directly to schedule the appointment when the reliability rating for the service-registered customer is less than the reliability rating threshold for the first business.

According to another embodiment, the present invention is directed to an apparatus that comprises a computer-based data center 12 for providing an automated computer network-based appointment scheduling service through which a plurality of customers registered with the service are individually capable of scheduling an appointment with one or more of a plurality of businesses registered with the service. The data center may comprise: (i) one or more computer databases 30, 32 that store data regarding the plurality of customers and the plurality of businesses; and at least one electronic computer device (e.g., web server 11) in communication with the one or more computer databases. The computer device(s) may be programmed to determine one or more available start times for a to-be-scheduled appointment on an appointment date for a service provided by a business of the plurality of businesses in response to receiving by the data center 12 via an electronic data network 18 an electronic communication from a service-registered customer to schedule the service with the business on the appointment date. The computer device(s) may be programmed to determine one or more acceptable start times for the to-be-scheduled appointment (i) based on at least the duration of the service for the to-be-scheduled appointment and existing appointments for the selected service provider(s) at the business on the appointment date, and (ii) by applying one or more rules to determine the one or more acceptable start times. In addition to other possible rules, the one or more rules may comprise: (i) a first rule that selects a first start time for the to-be-scheduled appointment that is prior to a first existing appointment for the business on the appointment date by the duration of the to-be-scheduled appointment; (ii) a second rule that selects a second start time for the to-be-scheduled appointment that is immediately after the first existing appointment for the business on the appointment date; and (iii) a third rule that eliminates other start times during the appointment date that would not be available given the first start time and the second start time and the duration of the to-be-scheduled appointment. Data regarding the duration of the service and the existing appointments for the first business on the appointment date may be stored in the one or more computer databases 30, 32.

According to another embodiment, the present invention is directed to a computer-implemented method for providing an automated computer network-based appointment scheduling service through which service-registered customers are individually capable of scheduling an appointment with a plurality of businesses scheduled with the service. The method may comprise the step of receiving at a computer-based data center 12 via an electronic data network 18 an electronic communication from a service-registered customer to schedule a to-be-scheduled appointment with a first business that is one of the plurality of service-registered businesses. The to-be-scheduled appointment is for a service on an appointment date.

The method may further comprise the step of determining, by at least one electronic computer device of the data center 12, one or more available start times for the to-be-scheduled appointment on the appointment date for the service (i) based on at least the duration of the service for the to-be-scheduled appointment and existing appointments for the first business on the appointment date, and (ii) by applying one or more rules to determine the one more acceptable start times, In addition to other possible rules, the one or more rules may comprise: (i) a first rule that selects a first start time for the to-be-scheduled appointment that is prior to a first existing appointment for the business on the appointment date by the duration of the to-be-scheduled appointment; (ii) a second rule that selects a second start time for the to-be-scheduled appointment that is immediately after the first existing appointment for the business on the appointment date; and (iii) a third rule that eliminates other start times during the appointment date that would not be available given the first start time and the second start time and the duration of the to-be-scheduled appointment. In addition, the method may further comprise the step of transmitting, by the data center via the electronic data network to the service-registered customer, the one or more acceptable start times.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments. The figures and descriptions of the embodiments have been simplified to illustrate elements that are relevant for a clear understanding of the embodiments, while eliminating, for purposes of clarity, other elements.

In general, it will be apparent to one of ordinary skill in the art that at least some of the embodiments described herein may be implemented in many different embodiments of software, firmware, and/or hardware. The software and firmware code may be executed by an electronic processor (e.g., a processor IC) or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a volatile and/or non-volatile memories, including memory chips (ROM or RAM ICs), EEPROMs, hard disk drives, etc. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The data center 12 may comprise one or more processors in communication with memory (e.g., RAM or ROM) via data bus. The data bus may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system comprising:
a computer-based data center for providing an automated computer network-based appointment scheduling service through which a plurality of customers registered with the service are individually capable of scheduling an appointment with one or more of a plurality of businesses registered with the scheduling service, wherein the data center comprises:
one or more computer databases that store data, wherein the stored data comprise data regarding the plurality of customers and the plurality of businesses; and
at least one electronic computer device in communication with the one or more computer databases, wherein the at least one electronic computer device is programmed to determine one or more acceptable start times for a to-be-scheduled appointment on an appointment date for a service provided by a first business of the plurality of businesses in response to receiving by the data center via an electronic data network an electronic communication from a first service-registered customer to schedule the service with the first business on the appointment date, wherein the at least one electronic computer device is programmed to determine one or more acceptable start times for the to-be-scheduled appointment (i)

based on at least the duration of the service for the to-be-scheduled appointment and one or more existing appointments for the first business on the appointment date, such that the to-be-scheduled appointment does not conflict with the one or more existing appointments of the first business, and (ii) by applying one or more rules to determine the one or more acceptable start times, wherein the one or more rules comprise:
- a first rule that selects a first start time for the to-be-scheduled appointment that is prior to a first existing appointment for the first business on the appointment date by the duration of the to-be-scheduled appointment;
- a second rule that selects a second start time for the to-be-scheduled appointment that is immediately after the first existing appointment for the first business on the appointment date; and
- a third rule that eliminates other start times during the appointment date that would not be available given the first start time and the second start time and the duration of the to-be-scheduled appointment, wherein the at least one electronic computer device comprises at least one processor circuit and at least one memory circuit in communication with the at least one processor circuit, and wherein data regarding the duration of the service and the existing appointments for the first business on the appointment date are stored in the one or more computer databases.

2. The system of claim 1, wherein the one or more rules further comprise:
- a fourth rule that selects a third start time for the to-be-scheduled appointment that is prior to a second existing appointment for the first business on the appointment date by the duration of the to-be-scheduled appointment;
- a fifth rule that selects a fourth start time for the to-be-scheduled appointment that is immediately after the second existing appointment for the first business on the appointment date; and
- a sixth rule that eliminates other start times during the appointment date that would not be available given the third start time and the fourth start time and the duration of the to-be-scheduled appointment.

3. The system of claim 1, wherein the one or more rules further comprise:
- a fourth rule that selects a third start time for the to-be-scheduled appointment that is prior to a first blackout period for the first business on the appointment date by the duration of the to-be-scheduled appointment; and
- a fifth rule that selects a fourth start time for the to-be-scheduled appointment that is immediately after the first blackout period for the first business on the appointment date; and
- a sixth rule that eliminates other start times during the appointment date that would not be available given the third start time and the fourth start time and the duration of the to-be-scheduled appointment, wherein data regarding blackout periods for the first business on the appointment date are stored in the one or more computer databases.

4. The system of claim 1, wherein the one or more rules further comprise a fourth rule that selects additional start times for the to-be-scheduled appointment, such that a break between the existing appointments and the to-be-scheduled appointment matches or exceeds the duration of at least one service provided by the first business.

5. The system of claim 1, wherein the one or more rules further comprise a fourth rule that randomly selects additional start times that will accommodate the to-be-scheduled appointment.

6. The system of claim 1, wherein the at least one electronic computer device determines the one or more acceptable start times on the appointment date for the to-be-scheduled appointment based on availability periods of the plurality of businesses, such that the to-be-scheduled appointment fits within an availability period.

7. The system of claim 1, wherein:
the data regarding the plurality of businesses comprises data regarding a service provider of the first business;
the electronic communication from the first service-registered customer comprises a communication to schedule the service with the service provider of the first business on the appointment date; and
the one or more existing appointments are the one or more existing appointments for the service provider of the first business on the appointment date.

8. The system of claim 7, wherein:
the data regarding a service provider of the first business comprises a shift start time and a shift end time for the appointment date; and
the one or more rules further comprise a fourth rule that eliminates start times that are not available given the shift start time and the shift end time of the service provider and the duration of the to-be-scheduled appointment.

9. The system of claim 8, wherein the one or more rules further comprises:
a fourth rule that selects a third start time for the to-be-scheduled appointment that is the shift start time; and
a fifth rule that eliminates the third start time for the to-be-scheduled appointment when the third start time is not available given the first start time and the duration of the to-be-scheduled appointment.

10. The system of claim 8, wherein:
the data regarding a service provider of the first business comprises at least one preferred time period for the service and at least one non-preferred time period for the service;
the computer-based data center communicates a limited number of acceptable start times to the first service-registered customer; and
the one or more rules further comprise a fifth rule that chooses start times that are within the at least one preferred time period for the service over start times that are within the at least one non-preferred time period for the service.

11. The system of claim 7, wherein:
the data regarding a service provider of the first business comprises a maximum number of appointments the service provider will provide on the appointment date;
the computer-based data center communicates the acceptable start times to the first service-registered customer; and
the number of acceptable start times communicated to the first service-registered customer is limited by the maximum number of appointments the service provider will provide on the appointment date.

12. The system of claim 1, wherein:
the computer-based data center communicates the acceptable start times to the first service-registered customer; and
the number of acceptable start times communicated to the first service-registered customer is limited by a maximum value.

13. The system of claim 1, wherein:
the data regarding the plurality of customers comprises at least one preferred time period for the first service-registered customer and at least one non-preferred time period for the first service-registered customer;
the computer-based data center communicates a limited number of acceptable start times to the first service-registered customer; and
the one or more rules further comprise a fourth rule that chooses start times that are within the at least one preferred time period over start times that are within the at least one non-preferred time period.

14. The system of claim 1, wherein:
the data regarding the plurality of businesses comprises at least one preferred time period for the service and at least one non-preferred time period for the service;
the computer-based data center communicates a limited number of acceptable start times to the first service-registered customer; and
the one or more rules further comprise a fourth rule that chooses start times that are within the at least one preferred time period over start times that are within the at least one non-preferred time period.

15. A computer-implemented method for providing an automated computer network-based appointment scheduling service through which service-registered customers are individually capable of scheduling an appointment with a plurality of businesses registered with the service, the method comprising:
receiving at a computer-based data center via an electronic data network an electronic communication from a service-registered customer to schedule a to-be-scheduled appointment with a first business that is one of the plurality of service-registered businesses, wherein the to-be-scheduled appointment is for a service on an appointment date, and wherein the data center comprises:
one or more computer databases that store data, wherein the stored data comprise data regarding the plurality of customers and the plurality of businesses; and
at least one electronic computer device in communication with the one or more computer databases, wherein the at least one electronic computer device comprises at least one processor circuit and at least one memory circuit in communication with the at least one processor circuit;
determining, by the at least one electronic computer device, one or more acceptable start times for the to-be-scheduled appointment on the appointment date for the service (i) based on at least the duration of the service for the to-be-scheduled appointment and one or more existing appointments for the first business on the appointment date, and (ii) by applying one or more rules to determine the one or more acceptable start times, wherein the one or more rules comprise:
a first rule that selects a first start time for the to-be-scheduled appointment that is prior to a first existing appointment for the first business on the appointment date by the duration of the to-be-scheduled appointment;
a second rule that selects a second start time for the to-be-scheduled appointment that is immediately after the first existing appointment for the first business on the appointment date; and
a third rule that eliminates other start times during the appointment date that would not be available given the first start time and the second start time and the duration of the to-be-scheduled appointment; and
transmitting, by the data center via the electronic data network to the service-registered customer, the one or more acceptable start times,
wherein data regarding the duration of the service and the existing appointments for the first business on the appointment date are stored in the one or more computer databases.

16. The method of claim 15, wherein the one or more rules further comprise:
a fourth rule that selects a third start time for the to-be-scheduled appointment that is prior to a second existing appointment for the first business on the appointment date by the duration of the to-be-scheduled appointment;
a fifth rule that selects a fourth start time for the to-be-scheduled appointment that is immediately after the second existing appointment for the first business on the appointment date; and
a sixth rule that eliminates other start times during the appointment date that would not be available given the third start time and the fourth start time and the duration of the to-be-scheduled appointment.

17. The method of claim 15, wherein the one or more rules further comprise:
a fourth rule that selects a third start time for the to-be-scheduled appointment that is prior to a first blackout period for the first business on the appointment date by the duration of the to-be-scheduled appointment; and
a fifth rule that selects a fourth start time for the to-be-scheduled appointment that is immediately after the first blackout period for the first business on the appointment date; and
a sixth rule that eliminates other start times during the appointment date that would not be available given the third start time and the fourth start time and the duration of the to-be-scheduled appointment, wherein data regarding blackout periods for the first business on the appointment date are stored in the one or more computer databases.

18. The method of claim 15, wherein the one or more rules further comprise a fourth rule that selects additional start times for the to-be-scheduled appointment, such that a break between the existing appointments and to-be-scheduled appointment matches or exceeds the duration of at least one service provided by the first business.

19. The method of claim 15, wherein the at least one electronic computer device determines the one or more acceptable start times on the appointment date for the to-be-scheduled appointment based on the availability periods of the plurality of businesses, such that the to-be-scheduled appointment fits within an availability period.

20. The method of claim 15, further comprising receiving, by the computer-based data center via the electronic data network, an electronic communication from the first business comprising:
phase-in date data regarding a date for which the first business is to accept appointments scheduled by service-registered customers via data center;
service attribute data regarding one or more attributes of one or more services provided by the first business; and
business hour data for the first business comprising first business hour data for a first time period and second business hour data for a second time period.

21. The method of claim 15, wherein:
the stored data regarding the plurality of businesses comprises at least one preferred time period for the service and at least one non-preferred time period for the service;
the acceptable start times transmitted to the service-registered customer are limited in number by a maximum value; and
the one or more rules further comprise a fourth rule that chooses start times that are within the at least one preferred time period for the service over start times that are within the at least one non-preferred time period for the service.

22. The method of claim 15, wherein at least one of the service-registered customers and the service-registered businesses is enabled to disable at least one of the one or more rules.

23. The method of claim 15, wherein at least one of the service-registered customers and the service-registered businesses is enabled to add supplemental rules to the one or more rules.

24. The method of claim 15, wherein:
the data regarding the plurality of businesses comprises data regarding a service provider of the first business;
the electronic communication from the service-registered customer comprises a communication to schedule the service on the appointment date with the service provider of the first business; and
the one or more existing appointments are the one or more existing appointments for the service provider of the first business on the appointment date.

25. The method of claim 24, wherein:
the data regarding a service provider of the first business comprises a shift start time and a shift end time for the service provider on the appointment date; and
the one or more rules further comprise a fourth rule that eliminates start times during the appointment date that are not available given the shift start time and the shift end time of the service provider and the duration of the to-be-scheduled appointment.

26. The method of claim 25, wherein the one or more rules further comprise:
a fourth rule that selects a third start time for the to-be-scheduled appointment that is the shift start time; and
a fifth rule that eliminates the third start time for the to-be-scheduled appointment when the third start time is not available given the first start time and the duration of the to-be-scheduled appointment.

27. The method of claim 25, wherein:
the data regarding a service provider of the first business comprises at least one preferred time and at least one non-preferred time;
the acceptable start times transmitted to the service-registered customer are limited in number by a maximum value; and
the one or more rules further comprise a fifth rule that chooses start times that are within the at least one preferred time of the service provider over start times that are within the at least one non-preferred time of the service provider.

28. The method of claim 24, wherein:
the data regarding a service provider of the first business comprises a maximum number of appointments the service provider will provide on the appointment date;
the computer-based data center communicates the acceptable start times to the service-registered customer; and
the acceptable start times communicated to the service-registered customer are limited in number by the maximum number of appointments the service provider will provide on the appointment date.

29. The method of claim 15, wherein:
the data regarding the plurality of customers comprises at least one preferred time and at least one non-preferred time for the service-registered customer;
the acceptable start times transmitted to the service-registered customer are limited in number by a maximum value; and the one or more rules further comprise a fourth rule that chooses start times that are within the at least one preferred time over start times that are within the at least one non-preferred time.

30. A computer-implemented method for providing an automated computer network-based appointment scheduling service through which service-registered customers are individually capable of scheduling an appointment with a plurality of businesses registered with the scheduling service, the method comprising:
receiving at a computer-based data center via an electronic data network an electronic communication from a service-registered customer to schedule a to-be-scheduled appointment for a service on an appointment date, wherein the data center comprises:
one or more computer databases that store data, wherein the stored data comprise data regarding the plurality of customers and the plurality of businesses; and
at least one electronic computer device in communication with the one or more computer databases, wherein the at least one electronic computer device comprises at least one processor circuit and at least one memory circuit in communication with the at least one processor circuit;
determining, by the at least one electronic computer device, one or more available businesses of the plurality of businesses that provide the service on the appointment date;
determining, by the at least one electronic computer device, one or more acceptable start times for the to-be-scheduled appointment on the appointment date for the service (i) based on at least the duration of the service for the to-be-scheduled appointment and one or more existing appointments for the one or more available businesses on the appointment date, and (ii) by applying one or more rules to determine the one or more acceptable start times, wherein the one or more rules comprise:
a first rule that selects a first start time for the to-be-scheduled appointment that is prior to a first existing appointment for a first available business of the one or more available businesses on the appointment date by the duration of the to-be-scheduled appointment;
a second rule that selects a second start time for the to-be-scheduled appointment that is immediately after the first existing appointment for the first available business of the one or more available businesses on the appointment date; and
a third rule that eliminates other start times during the appointment date that would not be available given the first start time and the second start time and the duration of the to-be-scheduled appointment; and
transmitting, by the data center via the electronic data network to the service-registered customer, the one or more acceptable start times,
wherein data regarding the duration of the service and the existing appointments for the first available business on the appointment date are stored in the one or more computer databases.

31. The method of claim 30, wherein the at least one electronic computer device repeats the one or more rules for each existing appointment for each available business of the one or more available businesses.

32. The method of claim 30, wherein the existing appointments comprise customer reservations, blackout periods, and classes.

* * * * *